United States Patent [19]

Saito

[11] Patent Number: 5,732,155
[45] Date of Patent: Mar. 24, 1998

[54] COMPRESSION CODING DEVICE AND EXPANSION REPRODUCING DEVICE FOR A PICTURE SIGNAL

[75] Inventor: Osamu Saito, Asaka, Japan

[73] Assignee: Fuji Photo Film Co., Ltd., Kanagawa, Japan

[21] Appl. No.: 628,481

[22] Filed: Apr. 5, 1996

[30] Foreign Application Priority Data

Apr. 7, 1995 [JP] Japan ..................................... 7-082216
Apr. 20, 1995 [JP] Japan ..................................... 7-095358

[51] Int. Cl.$^6$ ........................................................ G06K 9/36
[52] U.S. Cl. ........................... 382/232; 382/236; 382/238; 348/416
[58] Field of Search ..................................... 382/276, 232, 382/236, 238, 246; 348/416

[56] References Cited

U.S. PATENT DOCUMENTS 4,849,810 7/1989 Ericsson ..................... 348/416
5,379,351 1/1995 Fandrianto et al. ............ 382/276

OTHER PUBLICATIONS

Hiroshi Fujiwara, "The Newest MPEG Textbook", pp. 98–126 published Aug. 1, 1994 by Kabushiki Kaisha ASCII, Tokyo Japan.
"Information Technology –Coding of Moving Pictures and Associated Audio for Digital Storage Media up to About 1,5 Mbit/s", Draft Intl. Standard IS/IEC DIS 11172, pp. 140–168, Intl. Organization for Standardization, 1992.

Primary Examiner—Jose L. Couso
Assistant Examiner—Anh Hong Do

[57] ABSTRACT

A device for coding picture data by compression has a button circuit and a controller. When a button included in the button circuit is pushed by hand to enter a still picture mode command, the controller assigns a still picture mode to a group of pictures (GOP) appearing after the input of the command. For the GOP to be processed in the still picture mode, the controller substitutes an I picture (Intra-Picture) for at least one P picture (Predictive-Picture) included in the preceding GOP processed in a moving picture mode. At the same time, the controller sends to a multiplexer, information representative of the replacement of the picture type and information representative of the assignment of the still picture mode to the GOP. The multiplexer multiplexes such information in the preselected position of an output data format. On the other hand, a device for reproducing the picture data by expansion has a demultiplexer and a controller. The demultiplexer feeds to the controller the information representative of the still picture mode and the information representative of the replacement of the picture type. In response, the controller causes a decoder and following circuitry to decode the I picture data and write the resulting data in a first or a second predictor. A video signal representative of a still picture based on the stored picture data is output via a digital-to-analog converter.

18 Claims, 24 Drawing Sheets

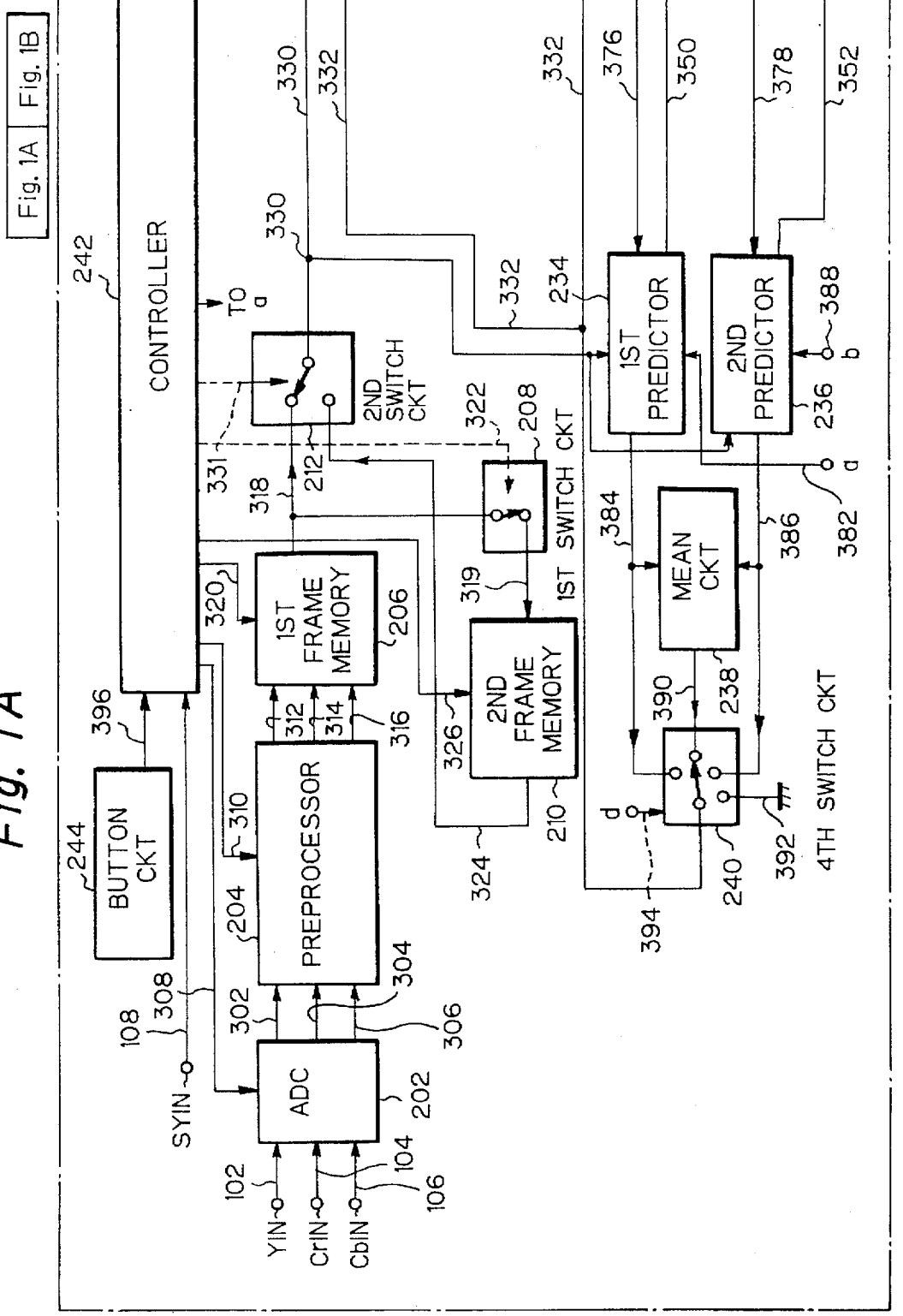

Fig. 6

| PARAMETER | | FOR NTSC | FOR PAL |
|---|---|---|---|
| NUMBER OF PIXELS (EFFECTIVE NUMBER)/ LINE | Y | 360 (352) | 360 (352) |
| | Cr | 180 (176) | 180 (176) |
| | Cb | 180 (176) | 180 (176) |
| NUMBER OF LINES/ FRAME | Y | 240 | 288 |
| | Cr | 120 | 144 |
| | Cb | 120 | 144 |
| NUMBER(MAX) OF FRAMES/SEC | | 29.97 | 25 |
| INTERLACE | | NO | NO |

Fig. 12

| Fig. 12A |
|----------|
| Fig. 12B |

Fig. 12A

| LAYER | ARCHITECTURE | NOTE |
|---|---|---|
| SEQUENCE LAYER | | PICTURE GROUP WITH SAME ATTRIBUTES (E.G. PICTURE SIZE & PICTURE RATE) |
| GOP LAYER | | MINIMUM UNIT OF PICTURE GROUP CONSTITUTING UNIT FOR RANDOM ACCESS (E.G. TIME FROM LEADING END OF SEQUENCE) |
| PICTURE LAYER | | ATTRIBUTES COMMON TO SINGLE PICTURE (E.G. PICTURE CODING MODE (TYPE)) |

Fig. 13A

| Fig. 13 |
|---|
| Fig. 13A |
| Fig. 13B |

| LAYER | ABBR. | NAME | BIT LENGTH | NOTE |
|---|---|---|---|---|
| SEQUENCE LAYER | SHC | Sequence Header Code | 32 | START CODE OF SEQUENCE LAYER |
| | HS | Horizontal Size | 12 | HORIZONTAL NUMBER OF PIXELS OF PICTURE |
| | VS | Vertical Size | 12 | VERTICAL NUMBER OF LINES OF PICTURE |
| | PAR | Pel Aspect Ratio | 4 | VERTICAL/HORIZONTAL PIXEL INTERVAL RATIO |
| | PR | Picture Rate | 4 | DISPLAY RATE OF PICTURE |
| | BR | Bit Rate | 18 | BITS/SEC ; RAISE TO UNIT ON 400 bps BASIS |
| | MB | Marker Bit | 1 | "1" |
| | VBS | VBV (Video Buffering Verifier) Buffer Size | 10 | PARAMETER DETERMINING VIRTUAL BUFFER SIZE FOR CODE AMOUNT CONTROL VBV=16×1 024×BS |
| | CPF | Constrained Parameters Flag | 1 | FLAG SHOWING THAT PARAMETERS DO NOT EXCEED LIMIT |

Fig. 13B

| | | | |
|---|---|---|---|
| LIQM | Load Intra Quantize Matrix | 1 | FLAG SHOWING PRESENCE OF QUANTIZING MATRIX DATA FOR INTRA MB |
| IQM | INTRA Quantizer Matrix | 8×64 | QUANTIZING MATRIX FOR INTRA MB |
| LNIQM | Load Non Intra Quantizer Matrix | 1 | FLAG SHOWING PRESENCE OF QUANTIZING MATRIX DATA FOR NON-INTRA MB |
| NIQM | Non Intra Quantizer Matrix | 8×64 | QUANTIZING MATRIX FOR NON-INTRA MB |
| ESC | Extension Start Code | 32 | EXTENSION DATA(SED) START CODE |
| SED | Sequence Extension Data | 8×n | DATA TO BE DETERMINED BY ISO FOR FUTURE |
| UDSC | User Data Start Code | 32 | USER DATA (UD) START CODE |
| UD | User Data | 8×n | USER DATA |
| SEC | Sequence End Code | 32 | SEQUENCE END CODE |

SEQUENCE LAYER

Fig. 14A

| LAYER | ABBR. | NAME | BIT LENGTH | NOTE |
|---|---|---|---|---|
| GOP LAYER | GSC | Group Start Code | 32 | GOP START CODE |
| | TC | Time Code | 25 | TIME FROM LEADING END OF SEQUENCE |
| | CG | Closed GOP | 1 | FLAG SHOWING THAT PICTURES OF GOP CAN BE REPRODUCED INDEPENDENTLY OF OTHER GOPS |
| | BL | Broken Link | 1 | FLAGS SHOWING THAT PRECEDING GOP DATA CANNOT BE USED FOR EDITING |
| | ESC<br>GED | Extension Start Code<br>Group Extension Data | 32<br>8×n | FUTURE |
| | UDSC<br>UD | User Data Start Dode<br>User Data | 32<br>8×n | USER DATA |

Fig. 14

| Fig. 14A |
|---|
| Fig. 14B |

Fig. 14B

| | | | |
|---|---|---|---|
| PICTURE LAYER | PSC | Picture Start Code | 32 | PICTURE LAYER START CODE |
| | TR | Temporal Reference | 10 | SURPLUS VALUE OF 1024 RESET AT HEAD OF GOP IN COHERENT PICTURE NO. |
| | PCT | Picture Coding Type | 3 | PICTURE TYPE |
| | VD | VBV Delay | 16 | INITIAL BUFFER STATUS AT RANDOM ACCESS |
| | FPFV | Full Pel Forward Vector | 1 | SHOWING WHETHER MOTION VECTOR ACCURACY IS BASED ON INTEGER OR HALF PIXEL |
| | FFC | Forward f Code | 3 | SEARCH RANGE FOR FORWARD MOTION VECTOR |

Fig. 15

| Fig. 15A |
|----------|
| Fig. 15B |

Fig. 15A

| LAYER | ABBR. | NAME | BIT LENGTH | NOTE |
|---|---|---|---|---|
| PICTURE LAYER | FPBV | Full Pel Backward Vector | 1 | SHOWING WHETHER MOTION VECTOR ACCURACY IS BASED ON INTEGER OR HALF PIXEL |
| | BFC | Backward f Code | 3 | SEARCH RANGE FOR BACKWARD MOTION VECTOR |
| | EBP<br>EIP | Extra Bit Picture<br>Extra Information Picture | 1×n<br>8×n | FLAG SHOWING PRESENCE OF OTHER PICTURE DATA<br>INFORMATION TO BE DETERMINED BY ISO FOR FUTURE |
| | EBP | Extra Bit Picture | 1 | "0" SHOWING ABSENCE OF EIP |
| | ESC<br>PED | Extension Start Code<br>Picture Extension Data | 32<br>8×n | FUTURE |
| | UDSC<br>UD | User Data Start Code<br>User Data | 32<br>8×n | USER DATA |

Fig. 15B

| SLICE LAYER | | | |
|---|---|---|---|
| | SSC<br>QS | Slice Start Code<br>Quantizer Scale | 32<br>5 | Slice Layer Start Code<br>Quantizing Step for Slice |
| | EBS<br>EIS | Extra Bit Slice<br>Extra Information Slice | 1×n<br>8×n | Showing Presence of Other Slice Data Future |
| | EBS | | 16 | "0" Showing Absence of EIS |

Fig. 16A

| Fig. 16 |
|---|
| Fig. 16A |
| Fig. 16B |
| Fig. 16C |

| LAYER | ABBR. | NAME | BIT LENGTH | NOTE |
|---|---|---|---|---|
| MACROBLOCK LAYER | MB STUFF | Macroblock Stuffing | 11 | DUMMY CODE FOR SHORT CODE AMOUNT |
| | MB ESC | Macroblock Escape | 11 | CODE CORRESPONDING TO 33 MBS SKIP |
| | MBAI | Macroblock Address Increment | 1-11 | NUMBER OF MBS SKIPPED PRECEDINGLY, PLUS 1 NUMBER OF MBS FROM RIGHT END OF VLC PICTURE, PLUS 1 |
| | MBTYPE | Macroblock Type | 1-8 | VLC SHOWING MB CODING MODE |
| | QS | Quantizer Scale | 5 | QUANTIZING STEP AFTER MB |
| | MHF | Motion Horizontal Forward Cod Motion Horizontal Forward r | 1-11 1-6 | DIFFERENCE BETWEEN HORIZONTAL COMPONENT OF FORWARD MOTION VECTOR OF MB AND VECTOR OF PRECEDING MB, AND CODED BY VLC DENOTED BY FORWARD f |
| | MVF | Motion Vertical Forward Code Motion Vertical Backward r | 1-11 1-6 | VERTICAL COMPONENT OF FORWARD VECTOR SAME IN EXPRESSION AS MHF |

Fig. 16B

MACROBLOCK LAYER

| | | | |
|---|---|---|---|
| MHB | Motion Horizontal Backward Code<br>Motion Horizontal Backward r | 1-11<br>1-6 | VLC REPRESENTATIVE OF DIFFERENCE BETWEEN BACKWARD MOTION VECTOR OF MB AND PRECEDING VECTOR, AND DENOTED BY BACKWARD f |
| MVB | Motion Virtbcal Backward Cod<br>Motion Vertical Backward r | 1-14<br>1-6 | VERTICAL COMPONENT OF BACKWARD MOTION VECTOR SAME IN EXPRESSION AS MHB |
| CBP | Coded Block Pattern | 3-9 | VLC SHOWING WHETHER OR NOT 6 BLOCKS OF MB HAVE COEFFICIENT |
| EOM | End of Macroblock | 1"1" | PRESENT ONLY FOR D PICTURE ; SHOWING END OF MACROBLOCK |

Fig. 16C

| | | | |
|---|---|---|---|
| BLOCK LAYER | DDSL | DCT DC Size Luminance | 2-7 | PRESENT FOR INTRA MB<br>VLC SHOWING NUMBER OF BITS OF NEXT DCT DC DIFFERENCE |
| | DDSC | DCT DC Size Chrominance | 2-8 | |
| | DDCD | DCT DC Differential | 1-8 | VLC SHOWING DIFFERENCE BETWEEN DC COMPONENT OF BLOCK AND THAT OF PRECEDING BLOCK |
| | DCF | DCT Coefficient First | 2-28 | PRESENT FOR MB OTHER THAN INTRA MB<br>VCL OF DC COMPONENT |
| | DCN | DCT Coefficient Next | 3-28 | VLC OF COMBINATION OF COEFFICIENT NOT 0 AND IMMEDIATELY PRECEDING 0 COEFFICIENT WHEN DCT COEFFICIENTS ARE FED IN ZIG-ZAG ORDER FROM ONE FOLLOWING DC COMPONENT |
| | EOB | End of Block | 2 | CODE SHOWING THAT ALL SUBSEQUENT COEFFICIENTS IN BLOCK ARE 0 |

COMPRESSION CODING DEVICE AND EXPANSION REPRODUCING DEVICE FOR A PICTURE SIGNAL

BACKGROUND OF THE INVENTION

1. Field of the Invention

The present invention relates to a compression coding device and an expansion reproducing device for a picture signal. More particularly, the present invention is concerned with a picture signal compression coding device capable of applying various kinds of coding systems in a preselected order to, e.g., consecutive pictures constituting a moving picture.

2. Description of the Background Art

To prepare for the full-scale multimedia environments dealing with audio, data and video integrally, ISO (International Organization for Standardization) is standardizing various kinds of information compression technologies which constitute the core of multimedia. Recently, ISO has standardized the moving picture coding system for CD-ROMs (Compact Disk Read Only Memories) as MPEG (Moving Picture Experts Group) 1.

A compression coding device adaptive to MPEG1 generates an I picture (Intra-Picture), a P picture (Predictive-Picture), and a B picture (Bidirectionally Predictive-Picture), as follows. To generate the I picture, the device applies an intra-frame coding system to preselected one of consecutive pictures constituting a moving picture and input thereto. To generate the P picture, the device applies an inter-frame forward predictive coding system to another preselected picture different from the picture assigned to the I picture. Further, to generate the B pictured, the device applies a bidirectional predictive coding system to two preselected pictures different from the pictures assigned to the I and P pictures. The resulting coded data are repeatedly output from the device in a particular order. FIG. 9 shows a picture stream b including a group of pictures GOP1 representative of a specific order in which the coded data are repeatedly output from the device. The coded or compressed data output in such an order are written to, e.g., a CD-ROM.

To reproduce the moving picture stored in the CD-ROM by use of a monitor, use is made of an expansion reproducing device also adaptive to MPEG1. The reproducing device decodes the coded data read out of the CD-ROM while transforming them to a signal having a format matching the monitor. So long as the P and B pictures are mixed with the I picture in a constant ratio to the I picture, as in the stream b of FIG. 9, the moving picture is agreeable with respect to motion and resolution when displayed on the monitor.

The conventional compression coding device and expansion reproducing device adaptive to MPEG1 have the following problem left unsolved. Assume that the coded data representative of the I, P and B pictures and output from the coding device are individually decoded by the reproducing device, and that a still picture based on the decoded data is displayed on a monitor or printed by a printer. Then, the still picture is noticeably deteriorated in resolution. This is ascribable to distortions caused by compression and expansion.

SUMMARY OF THE INVENTION

It is therefore an object of the present invention to provide a picture signal compression coding device capable of reducing the distortions of a still picture when applying a particular coding system to each picture of a moving picture, and an expansion reproducing device for decoding coded data output from the coding device.

In accordance with the present invention, a compression coding device for coding a picture signal by handling a preselected number of pictures as a single group of pictures, and coding digital picture data representative of the individual picture of the single group of pictures and divided into a plurality of macroblocks has a first storage device for storing picture data representative of a picture to be coded later than an input picture. A second storage device and third storage device store reproduced past picture data representative of a picture preceding a picture to be coded or reproduced future picture data representative of a picture following the picture to be coded. An averaging circuit averages the reproduced past picture data and reproduced future picture data output from the second storage or the third storage device to thereby output mean data. A selector selects and outputs one of the reproduced past picture data output from the second storage device or the third storage device, the mean data output from the averaging circuit in response to a select signal. A subtracter performs subtraction with picture data representative of the picture to be decoded and received on the first input terminal thereof and the past picture data or the mean data selected by the selector and received on the second input terminal thereof to thereby output difference data. A coder codes the picture data representative of the picture to be coded or the difference data. A button circuit outputs a command signal indicative of one of a moving picture mode and a still picture mode in response to a manual operation. A controller controls the first storage device, second storage device, third storage device, averaging circuit, selector, subtracter and coder in accordance with the command signal. To generate data representative of a first type of picture by coding, the controller causes the picture data representative of the picture to be coded to be input to the coder. To generate a second type of picture by inter-frame forward predictive coding, the controller causes the picture data representative of the picture to be coded to be applied to the first input terminal of the subtracter, feeds the select signal designating the reproduced past picture data to the selector to thereby feed the reproduced past picture data to the second input terminal of the subtracter, causes the selector to select the reproduced past picture data stored in the second storage device or the third storage device and deliver the reproduced past picture data to the second input terminal of the subtracter, and causes the subtracter to perform the subtraction and deliver the difference data to the coder. To generate a third type of picture by bidirectional predictive coding, the controller causes the picture data representative of the picture to be coded to be fed from the first storage device to the first input terminal of the subtracter, and delivers the select signal designating the mean data to the selector to thereby cause the selector to select the mean data and feed the mean data to the second input of the subtracter, and causes the subtracter to again perform subtraction and deliver the difference data to the coder. When a preselected number of third type of pictures, at least one first type of picture, a preselected number of third type of pictures and at least one second type of picture are sequentially input in this order, and when the moving picture mode is indicated by the command signal, the controller causes the at least one first type of picture, the preselected number of third type of pictures preceding the first type of picture, the at least one second type of picture, and the preselected number of third type of pictures preceding said second type of picture to be sequentially output in this order. When the still picture mode is indicated by the command signal, the controller causes the at least one second type of picture appeared in the moving picture mode to be replaced with the first type of picture.

Also, in accordance with the present invention, an expansion reproducing device for receiving a signal including digital picture data in which a preselected number of pictures are handled as a single group of pictures and coded by compression on a picture basis, and control data associated with the single group of pictures, and decoding the signal by applying an intra-frame coding system to at least one picture of the group of pictures, a forward inter-frame predictive coding system to at least one picture, and a bidirectional predictive coding system to a preselected number of pictures has a demultiplexer for demultiplexing the signal for separating the digital picture data and control data to thereby output demultiplexed picture data and demultiplexed control data. An inverse coder inversely codes the demultiplexed picture data to thereby output inversely coded picture data. A first and a second storage device each stores past reproduced picture data representative of a past picture preceding a picture to be decoded or further past picture data representative of a further past picture preceding the past picture. An averaging circuit averages the reproduced past picture data and reproduced further past picture data received from the first storage device or the second storage device to thereby output mean data. A first selector selects the reproduced past picture data received from the first storage device or the second storage device or the mean data received from the averaging circuit in response to a select signal. An adder adds data representative of the picture to be decoded and received from the inverse coder via the first input terminal thereof, and the reproduced past picture data or the mean data received from the first selector via the second input terminal thereof. A controller controls the demultiplexer, inverse coder, first storage device, second storage device, averaging circuit, first selector and adder in accordance with the demultiplexed control data. To reproduce a first type of picture by the inverse coding, the controller causes the inversely coded picture data to be input to the first storage device or the second storage device. To reproduce a second type of picture by the inverse forward inter-frame predicting coding, the controller causes the inversely coded picture data to be input to the first input terminal of the adder, feeds the select signal for selecting the reproduced past picture data to the first selector to thereby cause the first selector to deliver the reproduced past picture data stored in the first storage device or the second storage device to the second input terminal of the adder, and causes the adder to add the inversely coded picture data and reproduced past picture data and feed the result of addition to the first storage device or the second storage device. To reproduce a third type of picture by the bidirectional predictive coding, the controller causes the inversely coded picture data to be input to the first input terminal of the adder, feeds the select signal for selecting the mean data to the first selector to thereby cause the first selector to deliver the mean data to the second input terminal of the adder, and causes the adder to add the inversely coded data and mean data and output a result of addition. Assume that the controller receives information indicative of the still picture mode and included in the demultiplexed control data and information designating, among the plurality of pictures constituting the single picture group of pictures, a particular reproduced picture and also included in the demultiplexed control data. Then, the controller causes data representative of the reproduced picture designated by the first storage device or the second storage device to be output.

Further, in accordance with the present invention, a compression coding method for coding, on receiving a signal in which a preselected number of pictures are handled as a single group of pictures, digital picture data representative of the individual picture of the single group of pictures has a step of inputting, when generating a first type of picture by a preselected coding system, data of a picture to be coded to a coder to thereby code the data. When data of a second type of picture are to be generated by an inter-frame forward predictive coding system, a subtraction is executed with the data of the picture to be coded and data of a past reproduced picture preceding the picture to be coded. Data resulting from the subtraction are input to the coder to be coded thereby. When data of a third type of picture are to be generated by a bidirectional predictive coding system, a subtraction is executed with the data of the picture to be coded and mean data produced by averaging data of a past picture and data of a future picture respectively preceding and following the picture to be coded. Data resulting from the subtraction is input to the coder to be coded thereby. When a preselected number of third type of pictures, at least one first type of picture, a preselected number of third type of pictures and at least one second type of picture are sequentially input in this order as the preselected number of pictures, and when a moving picture mode is selected, the coder is caused to sequentially output the at least one first type of picture, preselected number of third type of pictures preceding the at least one first type of picture, at least one second type of picture and preselected number of third type of pictures preceding the at least one second type of picture in an order named. When a still picture mode is selected, the coder is caused to replace the at least one second type of picture with the at least one first type of picture.

Moreover, in accordance with the present invention, an expansion reproducing method for decoding a signal including digital picture data in which a preselected number of pictures are handled as a single group of pictures and coded by compression on a picture basis, and control data associated with the single group of pictures has a step of applying a preselected coding system assigned to a first type of picture to at least one picture included in the single group of pictures, applying an inter-frame forward predictive coding system assigned to a second picture to at least one picture included in the single group of pictures, and applying a bidirectional predictive coding system assigned to a third picture to a preselected number of pictures included in the single group of pictures. When the first type of picture is to be reproduced by inverse coding, data of a picture to be decoded are input to an inverse coder, and decoded picture data output from the inverse coder are input to a first storage device or a second storage device. When the second type of picture is to be reproduced by inverse inter-frame forward predictive coding, an addition is executed with the decoded picture data output from the inverse coder and decoded reproduced picture data of a past picture preceding the picture to be coded, and data resulting from the addition are fed to the first storage device or the second storage device. When the third type of picture is to be reproduced by inverse bidirectional predictive coding, an addition is executed with decoded picture data output from the inverse coder and mean data produced by averaging the decoded reproduced picture data of the past picture and decoded reproduced picture data of a further past picture preceding the past picture. When information indicative of a still picture mode and included in the control data and information designating a particular reproduced picture of the plurality of pictures constituting the single group of pictures and included in the control data are received, data of the particular reproduced picture to be output from the first storage or the second storage is output on the basis of the received information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A and 1B are combined;

FIGS. 1A and 1B are block diagrams schematically showing, when combined as shown in FIG. 1, a compression coding device embodying the present invention;

FIG. 2 shows how

FIGS. 2A and 2B are block diagrams schematically showing, when combined as shown in FIG. 2, an expansion reproducing device also embodying the present invention;

FIG. 6 tabulates parameters particular to an SIF (Source Input Format);

FIG. 12 shows how FIGS. 12A and 12B are combined;

FIGS. 12A and 12B show, when combined as shown in FIG. 12, the hierarchical structure of output data also particular to the coding device of FIGS. 1A and 1B;

FIGS. 13–16 show how FIGS. 13A–16C are combined respectively; and

FIGS. 13A and 13B, 14A and 14B, 15A and 15B and 16A, 16B and 16C each lists, when respectively combined as shown in FIGS. 13, 14, 15 and 16, a particular part of the contents of abbreviations shown in FIGS. 12A and 12B.

DESCRIPTION OF THE PREFERRED EMBODIMENTS

Figure 3:
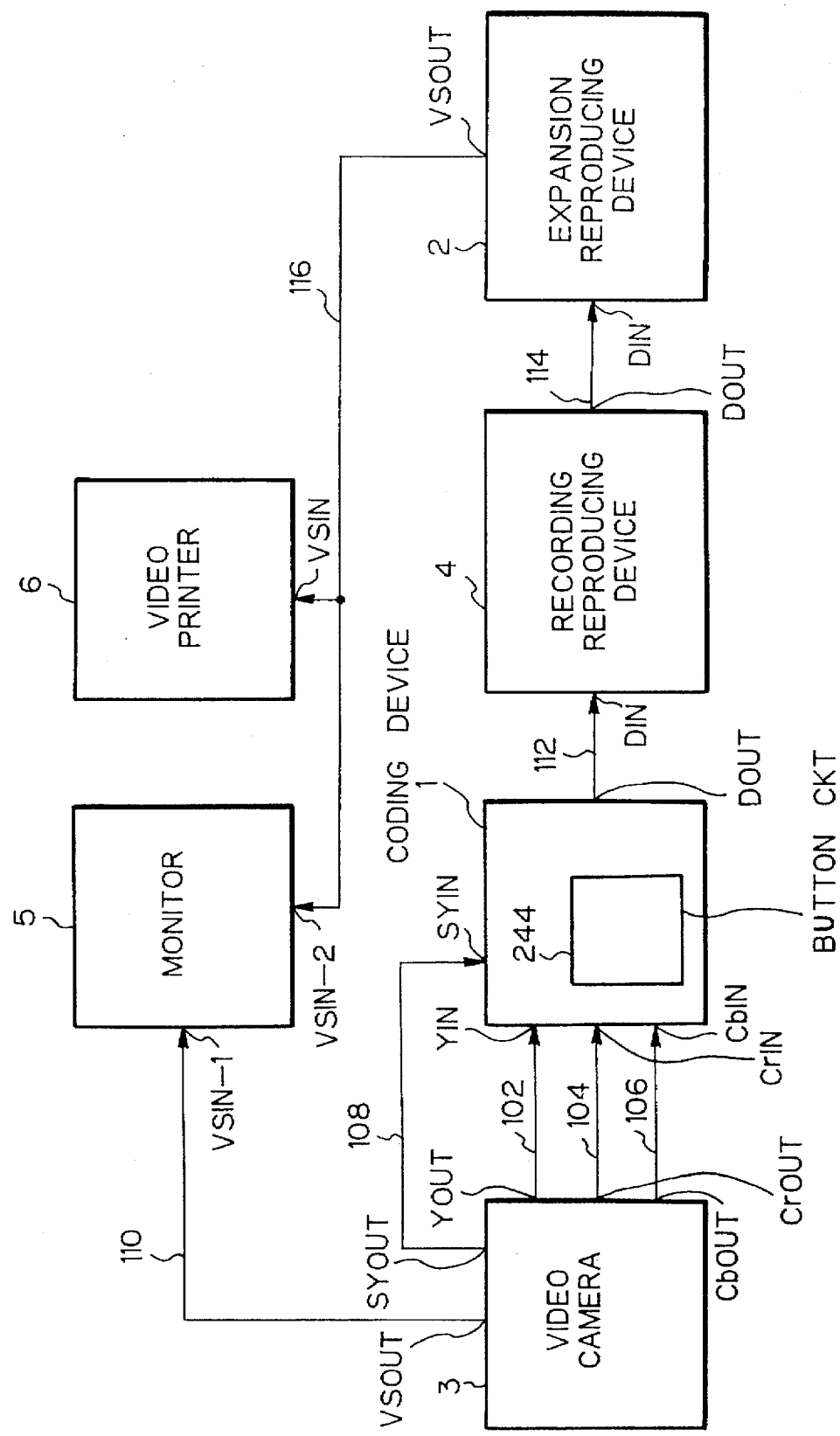
FIG. 3 is a block diagram schematically showing a specific system including the coding device and reproducing device embodying the present invention.

Referring to FIG. 3 of the drawing, a compression coding device and an expansion reproducing device both embodying the present invention will be described and are applied to an MPEG1 moving picture data processing system by way of example. As shown, a video camera 3 sequentially generates a video signal based on, e.g., the NTSC standard and representative of a moving picture. The video signal output from the camera 3 is sent to a compression coding device I embodying the present invention frame by frame. The coding device 1 codes each of the input pictures with a compression coding system suitable for the reproduction of a still picture, thereby outputting compressed picture data. A recording/reproducing device 4 reproduces the compressed picture data output from the coding device 1. An expansion reproducing device 2 also embodying the present invention decodes the compressed video data output from the recording/reproducing device 4 and reproduces an NTSC video signal based on the decoded data. A part of the NTSC video signal representative of a desired still picture is sent to a monitor 5 and a video printer 6, as will be described specifically later.

In the illustrative embodiment, the coding device 1 has a button circuit 244 including a button, not shown. When the button of the circuit 244 is pushed by the operator, the coding device 1 switches the order of a coding system from one assigned to a moving picture and having been applied to the consecutive pictures up to that time to one assigned to a still picture. The compressed picture data derived from the new coding order are sent to the reproducing device 2 by way of the recording/reproducing device 4. The reproducing device 2 decodes the compressed picture data and sends them to the monitor 5 and printer 6. As a result, a picture higher in resolution than the moving picture, i.e., a still picture is displayed on the monitor 5 and printed by the printer 6.

The recording/reproducing device 4 for recording and reproducing the compressed picture data output from the coding device 1 is adapted for a CD-ROM by way of example. The monitor 5 and video printer 6 are respectively capable of displaying and printing a picture represented by the NTSC video signal received from the reproducing device 2. The monitor 5 is connected not only to the reproducing device 2 but also to the camera 3. It is to be noted that the recording/reproducing device 4 intervening between the coding device 1 and the reproducing device 4 is not essential and may be omitted, if desired.

Specifically, the camera 3 and coding device 1 are interconnected by four signal lines 102, 104, 106 and 108. The camera 3 has output terminals YOUT, CrOUT, CbOUT and SYOUT respectively assigned to an analog luminance signal Y, an analog chrominance signal Cr (R-Y), an analog chrominance signal Cb (B-Y), and synchronizing signals SY. The coding device 1 has input terminals YIN, CrIN, CbIN and YIN respectively connected to the output terminals YOUT, CrOUT, CbOUT and SYOUT of the camera 3 by the signal lines 102–108. Hence, the luminance signal Y, chrominance signals Cr and Cb and synchronizing signals SY are sent from the camera 3 to the coding device 1 over the signal lines 102–108, respectively. The synchronizing signals SY include a horizontal synchronizing signal, a vertical synchronizing signal, and a color subcarrier signal. The camera 3 has another output terminal VSOUT assigned to the NTSC video signal. The output terminal VSOUT is connected to a first video signal input terminal VSIN-1 included in the monitor 5 by a signal line 110, so that the NTSC video signal is sent from the camera 3 to the monitor 5.

The coding device 1 has an output terminal DOUT for outputting the compressed picture data. The output terminal DOUT is connected to an input terminal DIN included in the recording/reproducing device 4 by a signal line 112. The compressed image data, i.e., a signal having a format matching a CD-ROM is fed from the coding device 1 to the recording/reproducing device 4 via the signal line 112. The recording/reproducing device 4 has an output terminal DOUT assigned to the compressed picture data and connected to an input terminal DIN included in the reproducing device 2 by a signal line 114. The compressed picture data reproduced by the recording/reproducing device 4, i.e., a signal having a format matching a CD-ROM is applied to the reproducing device 2 via the signal line 114. The reproducing device 2 decodes the compressed video data, generates an NTSC video signal out of the decoded data, and outputs the video signal on its video signal output terminal VSOUT. The output terminal VSOUT is connected to a second video signal input terminal VSIN-2 included in the monitor 5 and a video signal input terminal VSIN included in the printer 6 by a signal line 116. The reproduced NTSC video signal is delivered from the reproducing device 2 to the monitor 5 and printer 6 via the signal line 116.

Figure 1B:
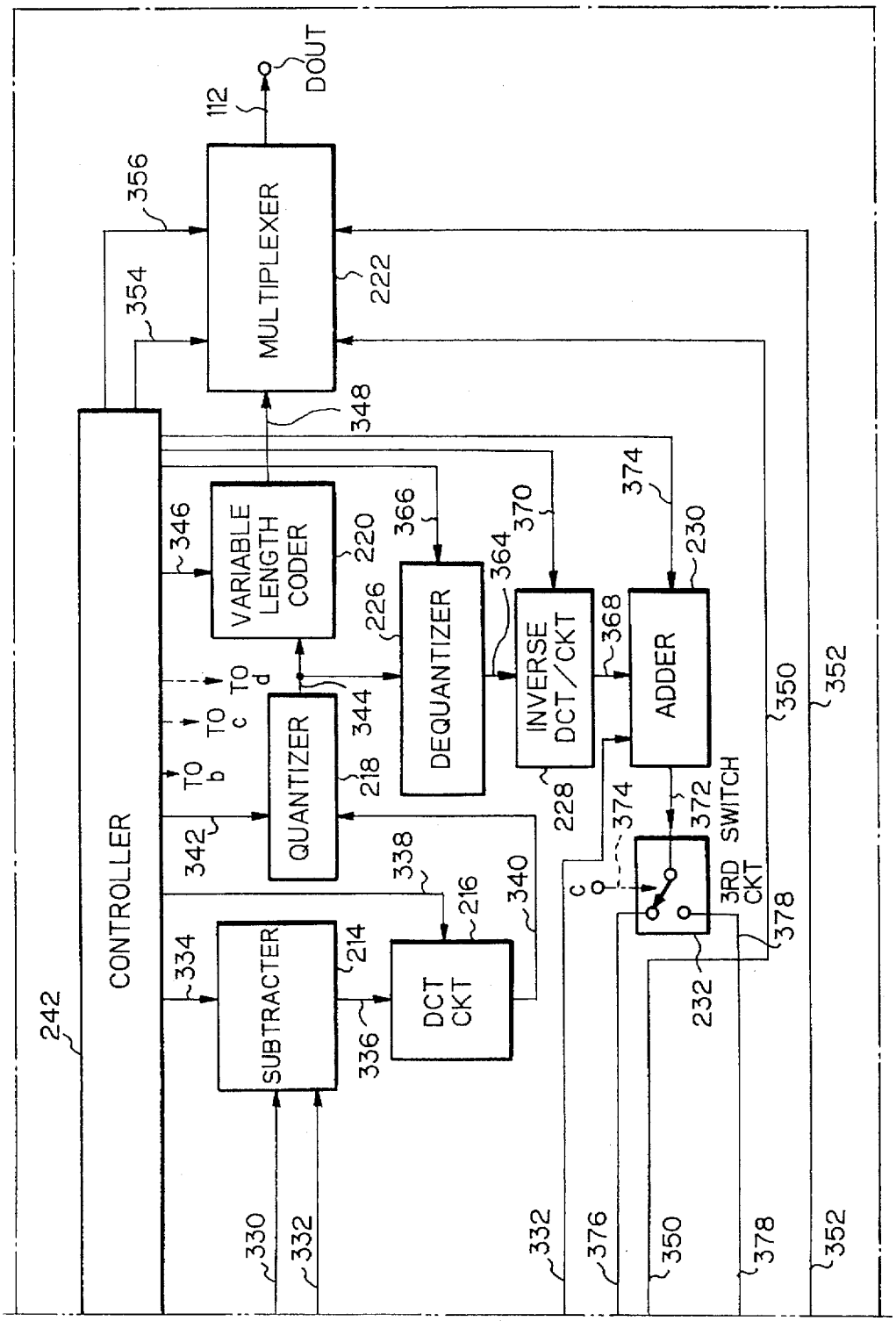

FIGS. 1A and 1B show the coding device 1 in detail when combined as shown in FIG. 1. As shown, the coding device 1 is made up of an analog-to-digital converter (ADC) 202, a preprocessor 204, a first frame memory 206, a first switching circuit 208, a second frame memory 210, a second switching circuit 212, a subtracter 214, a DCT (Discrete Cosine Transform) circuit 216, a quantizer 218, a variable length coder 220, a multiplexer 222, a dequantizer 226, an inverse DCT circuit 228, an adder 230, a third switch 232, a first predictor 234, a second predictor 236, a mean circuit 238, a fourth switching circuit 240, a controller 242, and the previously mentioned print-out button circuit 244. Among them, the dequantizer 226, inverse DCT circuit 228, adder 230, third switching circuit 232, first predictor 234, second predictor 236, mean circuit 238 and fourth switching circuit 240 constitute a local decoder in combination.

Figure 4:
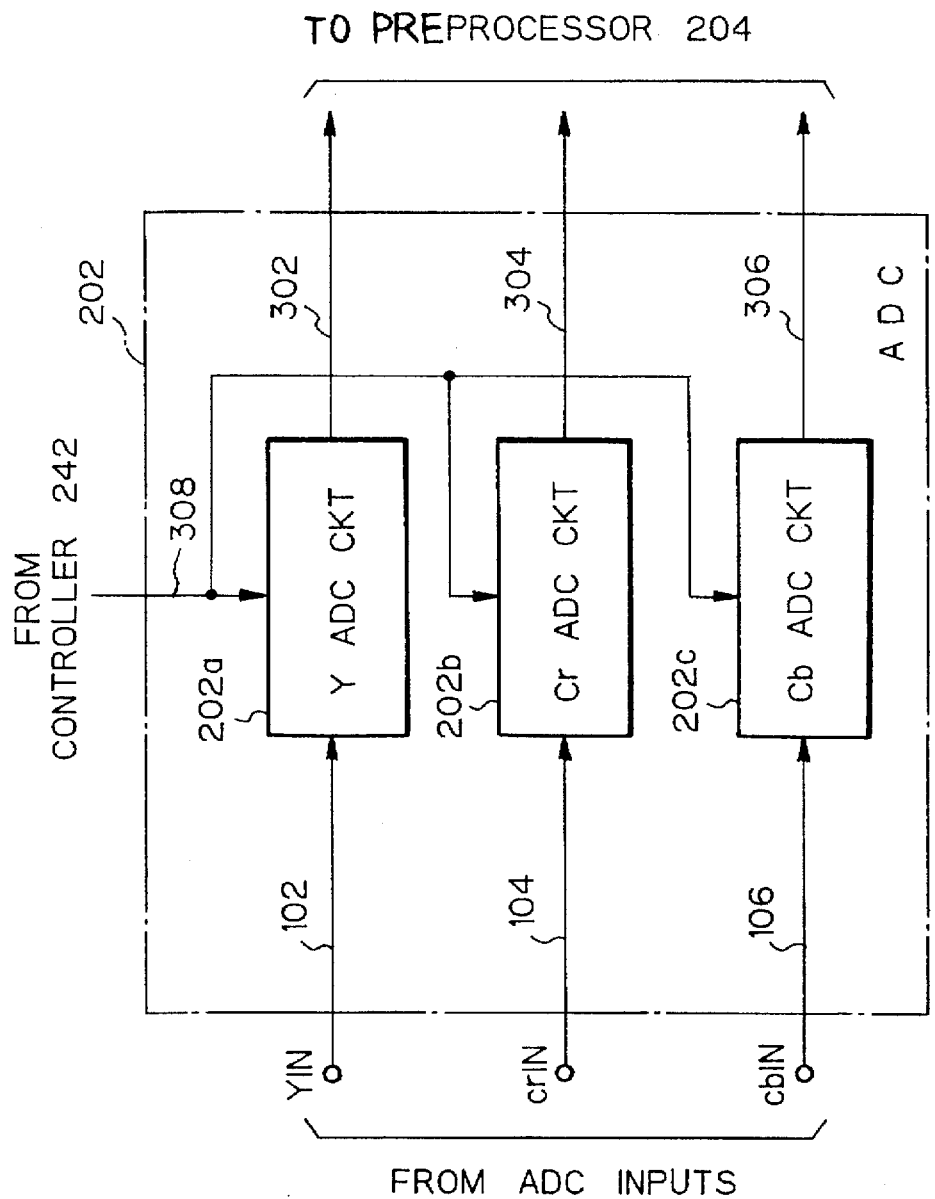
FIG. 4 is a schematic block diagram showing a specific configuration of an analog-to-digital converter shown in FIG. 1A.

As shown in FIG. 4, the ADC 202 has a Y ADC circuit 202a, a Cr ADC circuit 202b and a Cb ADC circuit 202c assigned to the luminance signal Y, chrominance signal Cr, and chrominance signal Cb, respectively. The ADC circuit 202a has its input connected to the input terminal YIN of the coding device 1 by a signal line 102. The analog luminance signal Y is input to the ADC circuit 202a. In the illustrative embodiment, the luminance signal Y has 240 effective scanning lines for a single field. The ADC circuit 202a transforms the input luminance signal Y to corresponding digital data. Specifically, a sampling signal is fed from the controller 242 to the ADC circuit 202a, as well as to the Cr ADC circuit 202b and Cb ADC circuit 202c, via a signal line 308. In the embodiment, the ADC circuit 202a digitizes the luminance signal Y on the basis of 720 pixels or dots for a single scanning line and eight bits for a single pixel in synchronism with the sampling signal.

The Cr ADC circuit 202b is connected to the input terminal CrIN of the coding device 1 by a signal line 104. In the illustrative embodiment, the analog chrominance signal Cr input to the ADC circuit 202b from the camera 3 has 240 effective scanning lines for a single field. The ADC circuit 202b transforms the chrominance signal Cr to corresponding digital data in response to the sampling signal fed from the controller 242. In the embodiment, the ADC circuit 202b digitizes the chrominance signal Cr on the basis of 360 pixels or dots for a single scanning line and eight bits for a single pixel.

Figure 5:
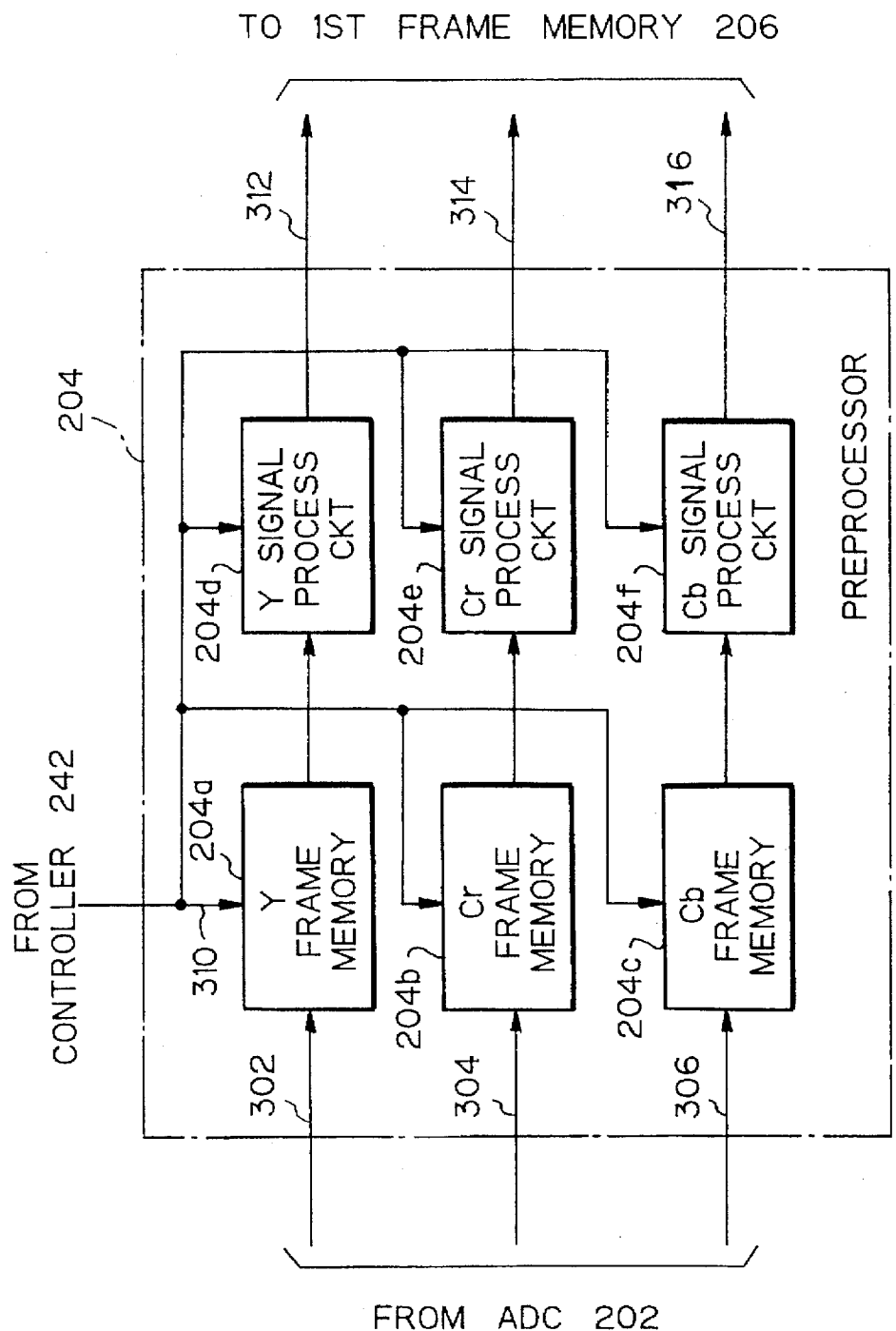
FIG. 5 is a schematic block diagram showing a specific configuration of a preprocessor also shown in FIG. 1A.

The Cb ADC circuit 202c has its input connected to the input terminal CbIN of the coding device 1 and receives the analog chrominance signal Cb sent from the camera 3. In the illustrative embodiment, the chrominance signal Cb has 240 effective scanning lines for a single field. The construction and operation of the ADC circuit 202c will not be described specifically because it is identical with the construction and operation of the ADC circuit 202b except for the kind of the signal to be dealt with. The preprocessor 204 is shown in FIG. 5 specifically. As shown, the preprocessor 204 has a Y frame memory 204a, a Cr frame memory 204b, and a Cb frame memory 204c. The above ADC circuits 202a, 202b and 202c have their outputs respectively connected to the inputs of the Y frame memory 204a, Cr frame memory 204b, and Cb frame memory 204c. It is to be noted that the chrominance signals Cb and Cr are respectively expressed as Cb=B (blue)−Y (luminance signal) and Cr=R (red)−Y (luminance signal).

Figure 7:
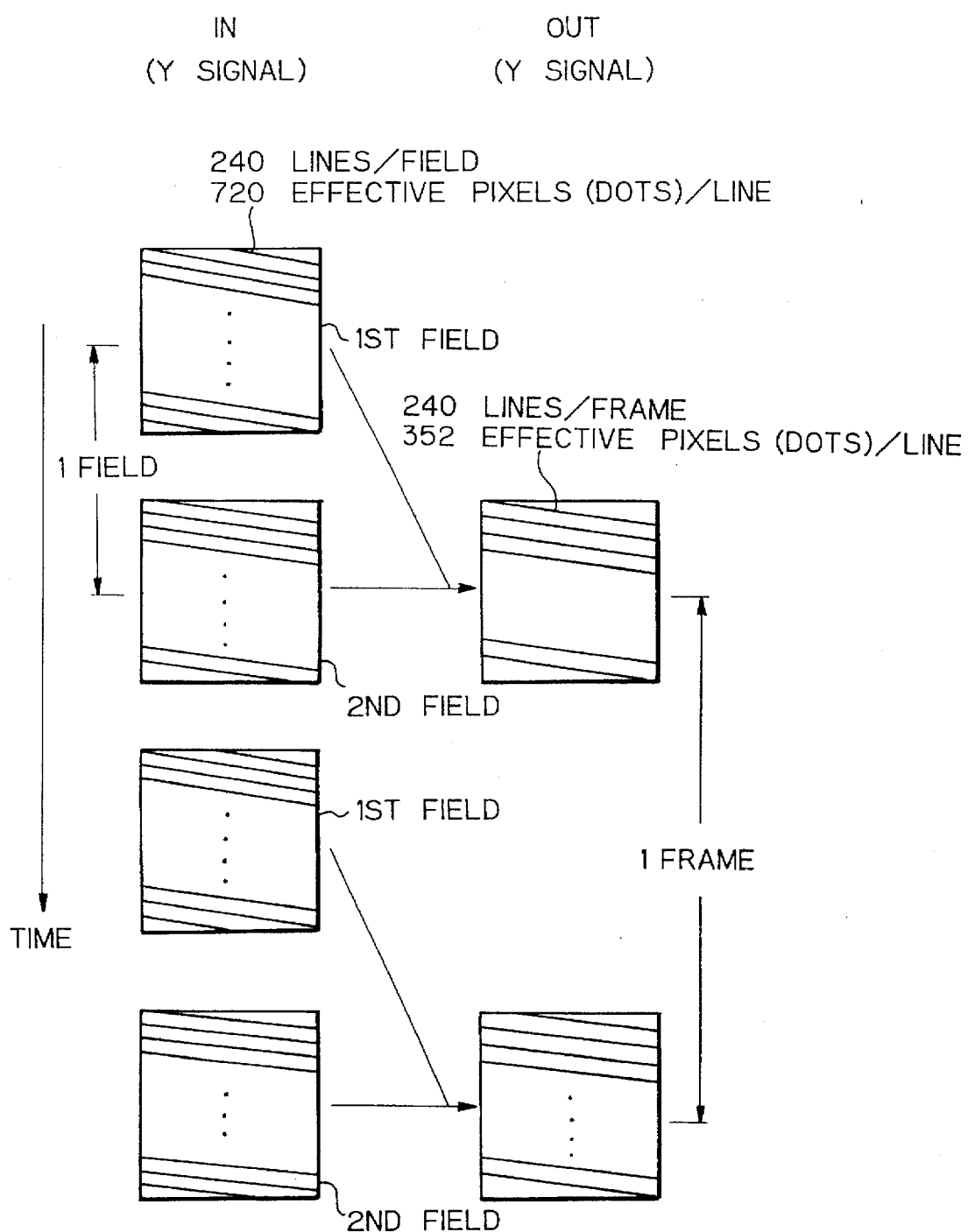
FIG. 7 demonstrates how the preprocessor shown in FIG. 1A processes a luminance signal specifically.
Figure 8:
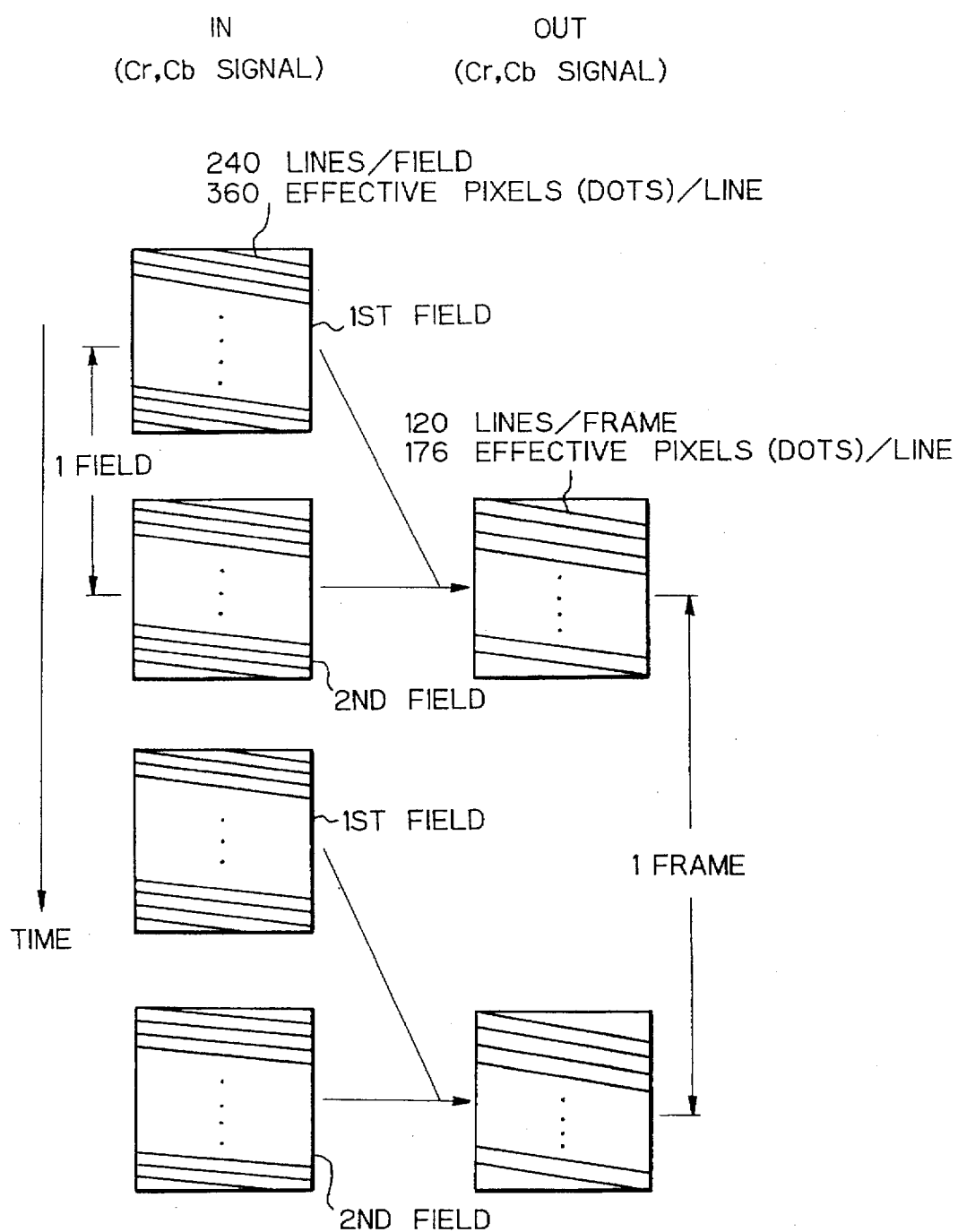
FIG. 8 demonstrates how the preprocessor processes chrominance signals specifically.

In the embodiment, the preprocessor 204 generates a single picture out of the first and second fields sequentially received from the ADC 202 at a field period, and outputs the picture at a frame period. Also, in the embodiment, a single frame output from the preprocessor 204 has parameters identical with SIF parameters particular to MPEG1. The SIF parameters are listed in FIG. 6. FIGS. 7 and 8 demonstrate the concept of processing to be executed by the preprocessor 204. While the preprocessor 204 is assumed to transform the NTSC video signal to the NTSC SIF, it may alternatively receive, e.g., a PAL (Phase Alternation by Line) video signal and transforms it to a PAL SIF. The NTSC signal has 525 scanning lines among which 480 scanning lines are effective.

Specifically, as shown in FIG. 5, the Y frame memory 204a sequentially stores the output data of the Y ADC circuit 202a, FIG. 4, and is implemented by a DRAM (Dynamic Random Access Memory) by way of example. In the illustrative embodiment, the first and second fields, i.e., one frame of Y data are sequentially input and written to the frame memory 204a. The Cr frame memory 204b and Cb frame memory 204c may also be implemented by DRAMs and sequentially store one frame of Cr data and one frame of Cb data, respectively, received from the ADC circuits 202b and 202c, FIG. 4. To allow such data to be written and read out of the frame memories 204a–204c, the controller 242 sends control signals, including write control signals and read control signals, to the preprocessor 204 via a control line 310. The Y data, Cr data and Cb data read out of the frame memories 204a, 204b and 204c are respectively applied to the input of a Y signal processing circuit 204d, the input of a Cr signal processing circuit 204e, and the input of a Cb signal processing circuit 204f.

The Y signal processing circuit 204d generates one frame of Y data out of the first and second fields, i.e., one frame of Y data stored in the frame memory 204a. In the embodiment, one frame of Y data consist of 240 scanning lines and 352 pixels or dots for a single scanning line. For example, the processing circuit 204d may transform the 720 dots of one scanning line to 352 dots by thinning them at suitable intervals. Likewise, the Cr signal processing circuit 204e generates one frame of Cr data out of two fields of Cr data stored in the frame memory 204b while the Cb signal processing circuit 204f generates one frame of Cb data out of two fields of Cb data stored in the frame memory 204c. In the embodiment, one frame of Cr data and one frame of Cb data each consists of 120 scanning lines and 176 pixels or dots for a single scanning line. For example, the processing circuits 204e and 204f may each reduce 360 dots of one scanning line to 352 dots by thinning them at suitable intervals, and then generate a single scanning line out of the two thinned scanning lines. The above data processing is executed in accordance with the control signals send from the controller 242 over the control line 310. The processing circuits 204d, 204e and 204f deliver their outputs 312, 314 and 316, respectively, to the first frame memory 206, FIG. 1A.

Figure 10:
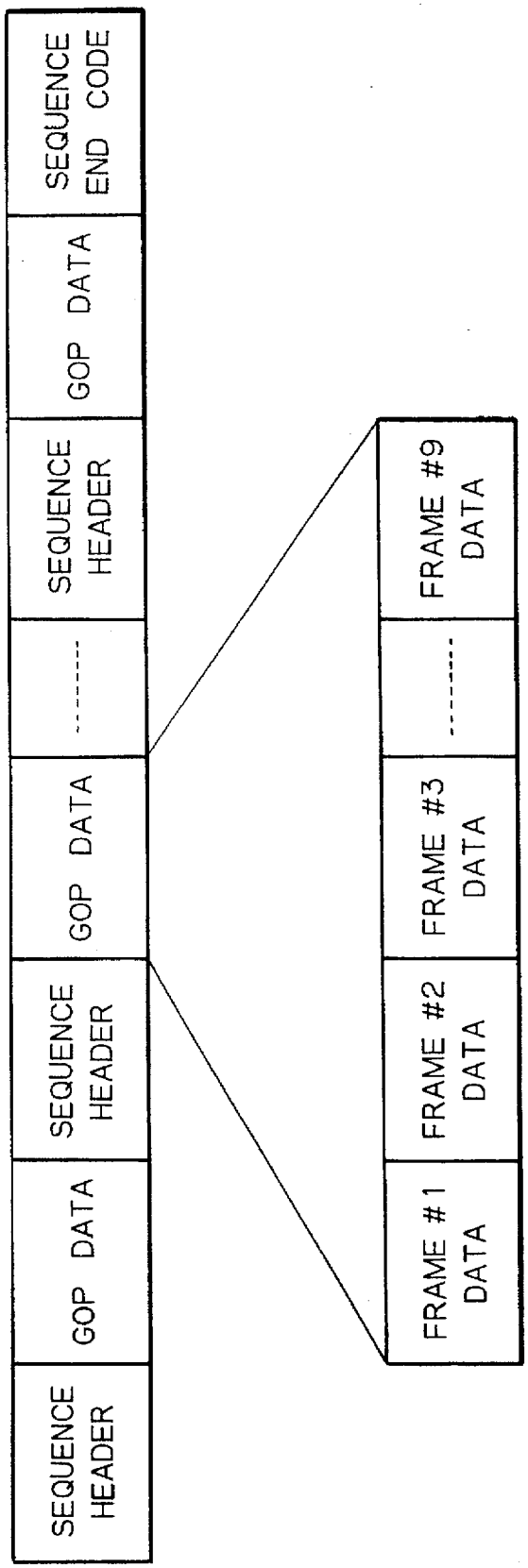
FIG. 10 shows a GOP (Group of Picture) format applicable to the coding device of FIGS. 1A and 1B.

In the illustrative embodiment, the picture data representative of the individual picture other than the I picture are generated on the basis of picture data preceding and following them, so that a single picture cannot provide complete information alone. Moreover, various trick modes including a fast forward mode and a rewind mode are needed when it comes to reproduction using storage media. For these reasons, the embodiment handles data representative of a plurality of pictures as a single GOP (see FIG. 10), as in MPEG1. A single GOP may consist of any desired number of pictures (N) not exceeding fifteen or so. In the embodiment, a single GOP consisting of nine pictures is assigned to a moving picture while a single GOP consisting of three pictures and a single GOP consisting of six pictures, i.e., nine pictures in total are assigned to a still picture. To meet these conditions, the first frame memory 206, FIG. 1A, has a capacity great enough to accommodate nine frames.

Specifically, the first frame memory 206 is implemented as a DRAM by way of example and capable of storing nine frames of Y data, nine frames of Cr data, and nine frames of Cb data. In the embodiment, frame memories #1 through #9 are allocated to the Y data; the Y data sequentially received from the preprocessor 204 frame by frame are repeatedly written to the frame memories #1 through #9 in this order. Likewise, nine frame memories are allocated to each of the Cr data and Cb data so as to store them in the same manner as the frame memories #1 through #9. The data are written to the frame memories in response to the write control signals fed from the controller 242 via a control line 320. The data stored in the memory 206 may be read out at a timing which is, e.g., one frame later than the write timing. In the embodiment, the Y data, Cb data and Cr data should only be read out in this order, and moreover should only be repeatedly read out of the frame memories #1 through #9 in this order. The reading procedure is controlled by the write control signals also fed from the controller 242 via the control line 320. The memory 206 has an output 318 connected to the corresponding inputs of the first and second switching circuits 208 and 212.

Figure 9:
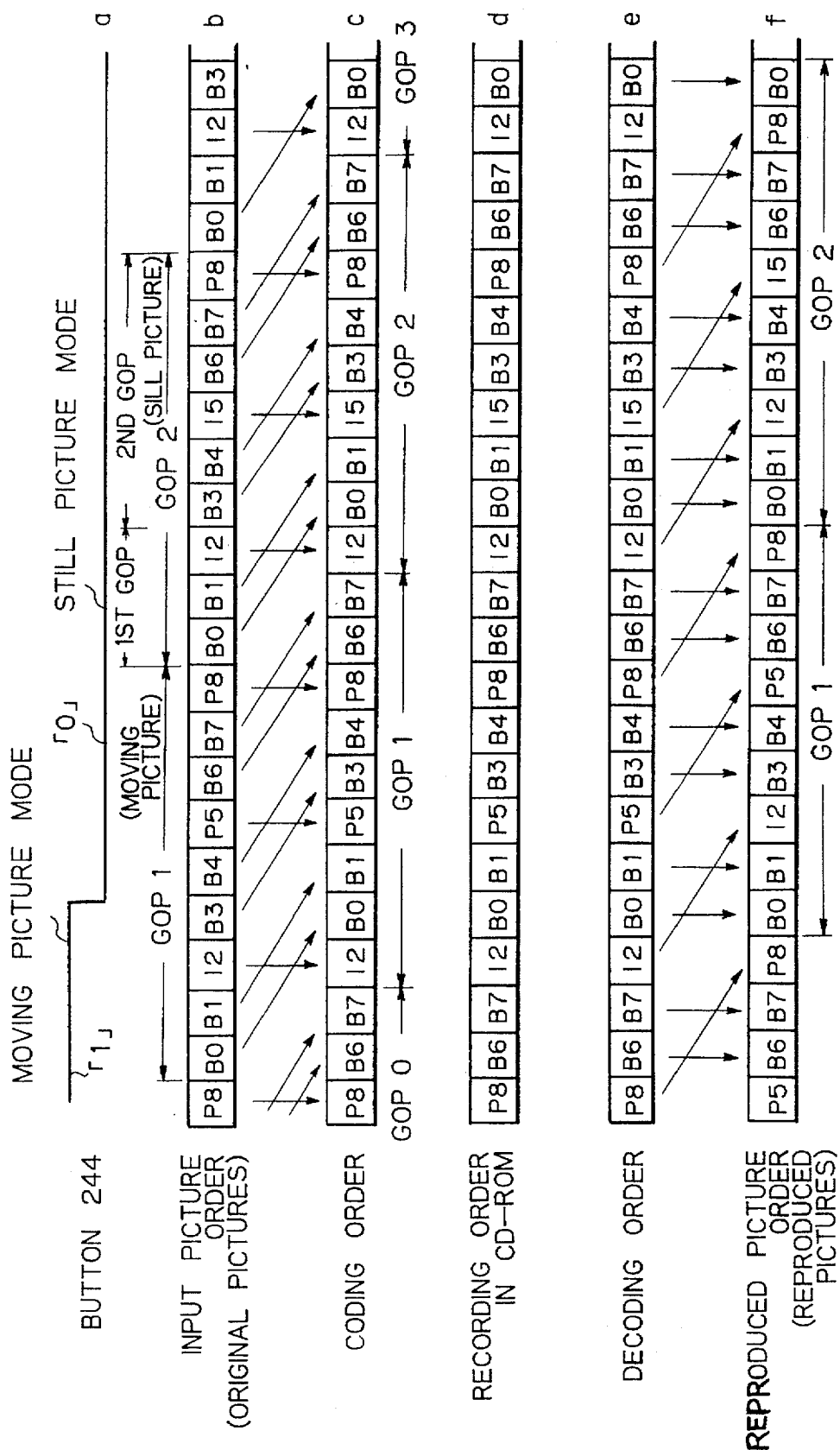
FIG. 9 shows specific picture streams representative of the operations of the coding device and reproducing device.

The first switching circuit or selector 208 selectively connects its input 318 to its output 319 or disconnects the former from the latter, as instructed by a control signal fed from the controller 242 via a control line 322. The selector 208 connects the input 318 to the output 319 when the coding device 1 generates a B picture, or disconnects the former from the latter when it generates an I picture or a P picture. More specifically, as shown in FIG. 9, the selector 208 connects the input 318 to the output 319 when input pictures B0 and B1, B3 and B4 or similar two consecutive frames for generating a B picture (picture stream b) are to be read out of the frame memory 206. The selector 208 disconnects the input 318 from the output 319 when an input picture I2 or similar picture for generating an I picture or an input picture P5 or similar picture for generating a P picture is to be read out of the frame 206. The selector 208 has its output 319 connected to the input of the second frame memory 210. As a result, two frames of video data for generating a B picture are written to the memory 210.

The period M at which I pictures or P picture appear has an optimal value dependent on the motion of the moving picture. The illustrative embodiment assigns a period M of 3 to both a moving picture and a still picture, as FIG. 9 indicates; that is, two B pictures intervene between an I picture and a P picture. For this reason, the second frame memory 210 has a capacity capable of accommodating two frames. The period M of 3 is only illustrative and may be replaced with any other suitable period.

The second frame memory 210 is, e.g., a DRAM capable of storing two frames of Y data, two frames of Cr data, and two flames of Cb data, as stated above. Frame memories #1 and #2 are allocated to the Y data in order to sequentially repeatedly store two frames of Y data received from the first switching circuit 208. Likewise, two frame memories are allocated to each of the Cr data and Cb data so as to store them in the same manner as the frame memories #1 and #2. The storage is executed in response to write control signals fed from the controller 242 via a control line 326.

The above data stored in the frame memory 210 are read out when B pictures are to be coded. The first B picture, e.g., B0 included in the stream b of FIG. 9 is read out of the memory #1 of the memory 210, and then the second picture B1 is read out of the memory #2. Such a reading procedure is controlled by read control signals received from the controller 242 via the control line 326. The memory 2 10 has an output 324 connected to the corresponding input of the second switching circuit 212.

The second switching circuit or selector 212 selectively connects one of its two inputs 318 and 324 to its output 330, as instructed by a control signal 331 fed from the controller 242. In the illustrative embodiment, the selector 212 selects the input 318 when an I picture or a P picture is to be generated, or selects the input 324 when a B picture is to be generated. The output 330 is connected to the input of the subtracter 214.

The embodiment uses predictive coding which produces a difference between the signal value of a given picture and that of another picture (past picture or future picture as in MPEG1), i.e., causes the subtracter 214 to perform subtraction. The predictive coding involves three different coding modes, i.e., an intra-frame predictive coding mode, a forward inter-frame predictive coding mode, and an interpolative (bidirectional) inter-frame predictive coding mode. The intra-frame predictive coding mode is used to generate an I picture without using two prediction memories, i.e., data stored in the first and second predictors 234 and 236 in the embodiment. The forward inter-frame predictive coding mode is used to generate a P picture by using the data stored in the predictor 234 or 236. The interpolative inter-frame predictive coding mode generates a B picture by using the mean of the data resulting from the forward inter-frame predictive coding and backward inter-frame predictive coding, i.e., by causing the mean circuit 238 to produce the mean of the two predictors 234 and 236. As for a P picture, the predictive coding sometimes includes the intra-frame predictive coding in a procedure dealing with macroblocks, as will be described later. Also, as for a B picture, the predictive coding sometimes includes the intra-frame predictive coding, forward inter-frame predictive coding, and backward inter-frame predicting coding for the procedure dealing with macroblocks.

Specifically, assume that an I picture should be generated, i.e., the intra-frame predictive coding should be executed. Then, the subtracter 214 subtracts a data value "0" fed from the fourth switching circuit 240 from the data value 330 of one picture (e.g. I2 included in the stream b of FIG. 9) and fed from the frame memory 206 for generating the I picture. It is to be noted that the data value "0" does not rely on the two prediction memories stated above. In this case, the data received from the frame memory 206 directly appear on the output 336 of the subtracter 214. If desired, the subtracter 214 may directly output the input data 330 on its output 336 without subtracting "0" from the data 330.

For a P picture, i.e., the forward inter-frame predictive coding, the subtracter 214 subtracts from the data value 330 of one picture (e.g. P5 included in the stream b of FIG. 9) and received from the frame memory 206 for generating the P picture the data value 332 which is a preselected number of frames later than the above picture (e.g. I2 three frames later than P5) and received from one of the predictors 234 and 236 via the fourth switching circuit 240. This subtraction is effected with pixels corresponding in position to each other. The resulting difference appears on the output 336 of the subtracter 214.

Further, for a B picture, i.e., the bidirectional predictive coding, the subtracter 214 subtracts from the data value 330 of one picture (e.g. B3 in the stream b of FIG. 9) received from the frame memory 210 for generating the B picture the output data 322 of the mean circuit 238. The data 322 is representative of the mean of a picture a preselected number of frames earlier than the above picture (e.g. P5 two frames earlier than B3) and a picture a preselected number of frames later than the same (e.g. I2 one frame earlier than B3). This subtraction is also effected with pixels corresponding in position to each other. The resulting difference appears on the output 336 of the subtracter 214. For the above subtraction, the controller 242 delivers a control signal 334 to the subtracter 214.

Figure 11:
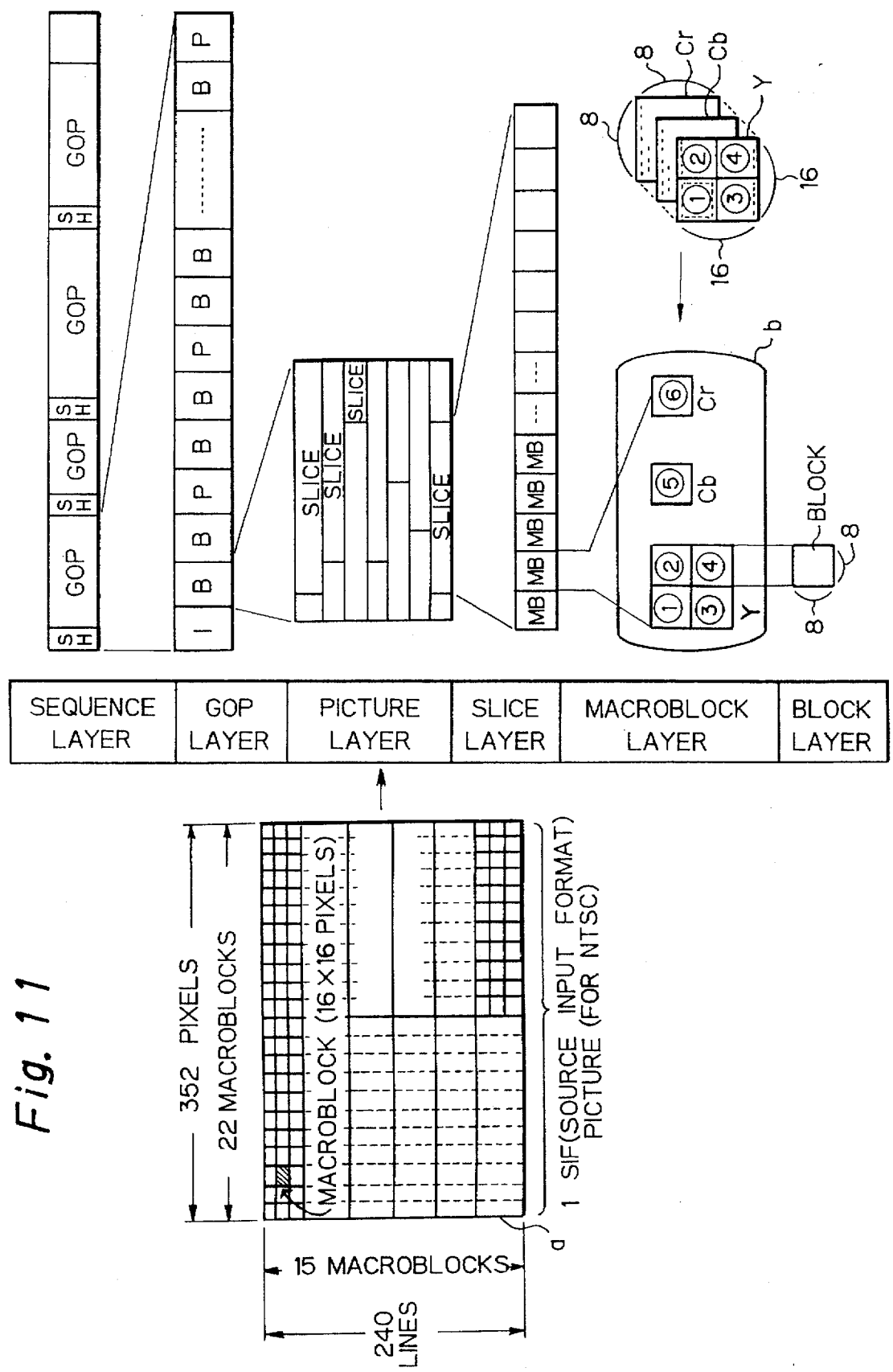
FIG. 11 shows the hierarchical structure of picture data particular to the coding device of FIGS. 1A and 1B.

More specifically, for the above subtraction, a macroblock (MB) in the form of a 16×16 pixel matrix and constituting one picture together with other macroblocks (see a portion a of FIG. 11) is dealt with as a unit, as in MPEG1. The macroblock is subdivided into blocks each being implemented as an 8×8 pixel matrix (see a portion b of FIG. 11). Spatial data compression using DCT, which will be described, handles one block as a unit. DCT is executed with four luminance signal Y blocks ($Y_1, Y_2, Y_3$ and $Y_4$), a single chrominance signal Cr block, and a single chrominance signal Cb block. The output 336 of the subtracter 214 is connected to the input of the DCT circuit 216.

The DCT circuit 216 includes a storage device, not shown, for temporarily storing the pixel data of six blocks in total which constitute the macroblock. The pixel data of the macroblock sequentially received from the subtracter 214 are written to the storage device under the control of a control signal 338 fed from the controller 242. Further, the DCT circuit 216 under the control of the controller 242 reads the pixel data of the individual block of the macroblock out of the storage device and executes DCT, or bidimensional orthogonal transform, with the pixel data. As a result, the picture data lying in the space domain are transformed to data lying in the frequency domain, i.e., transform coefficients. The transform coefficients are sequentially fed from the output 340 to the quantizer 218 in the order of $Y_1, Y_2, Y_3, Y_4$, Cb and Cr.

The quantizer 218 normalizes the block-by-block transform coefficients received from the DCT circuit 216 while being controlled by a control signal 342 fed from the controller 242. Specifically, the quantizer 218 divides the transform coefficients by quantizing steps in the order of DC components and low frequency to high frequency components. The quantizer 218 delivers its output 344 to the variable length coder 220 and dequantizer 226 which is included in the previously mentioned local decoder.

The variable length coder 220 codes the normalized transform coefficients by run-length coding and Huffman coding under the control of a control signal 346 fed from the controller 242. The coded data appear on the output 348 of the coder 220. By the procedure described so far, the picture data are subjected to adaptive DCT. The output 348 of the coder 220 is connected to the input of the multiplexer 222.

The multiplexer 222 has a register having a fixed bit length, e.g., eight bits and fills it with the variable length coded data sequentially received from the variable length coder 220, thereby producing eight-bit data. Also, the multiplexer 222 confines the amount of codes of each block in a preselected range on the basis of a bit arrangement associated with the characteristic of the picture. For example, when the total amount of data including in a given block and consisting of DC components and AC components exceeds a preselected amount, the multiplexer 222 discards the excess data. Under the control of a control signal 354 fed from the controller 242, the multiplexer 222 multiplexes the picture data having the fixed length in, in the embodiment, the preselected position of a video bit stream structure shown in FIGS. 12A and 12B and identical with the structure of MPEG1. FIGS. 13A through FIG. 16C list the contents of abbreviations shown in FIGS. 12A and 12B.

Figure 12B:
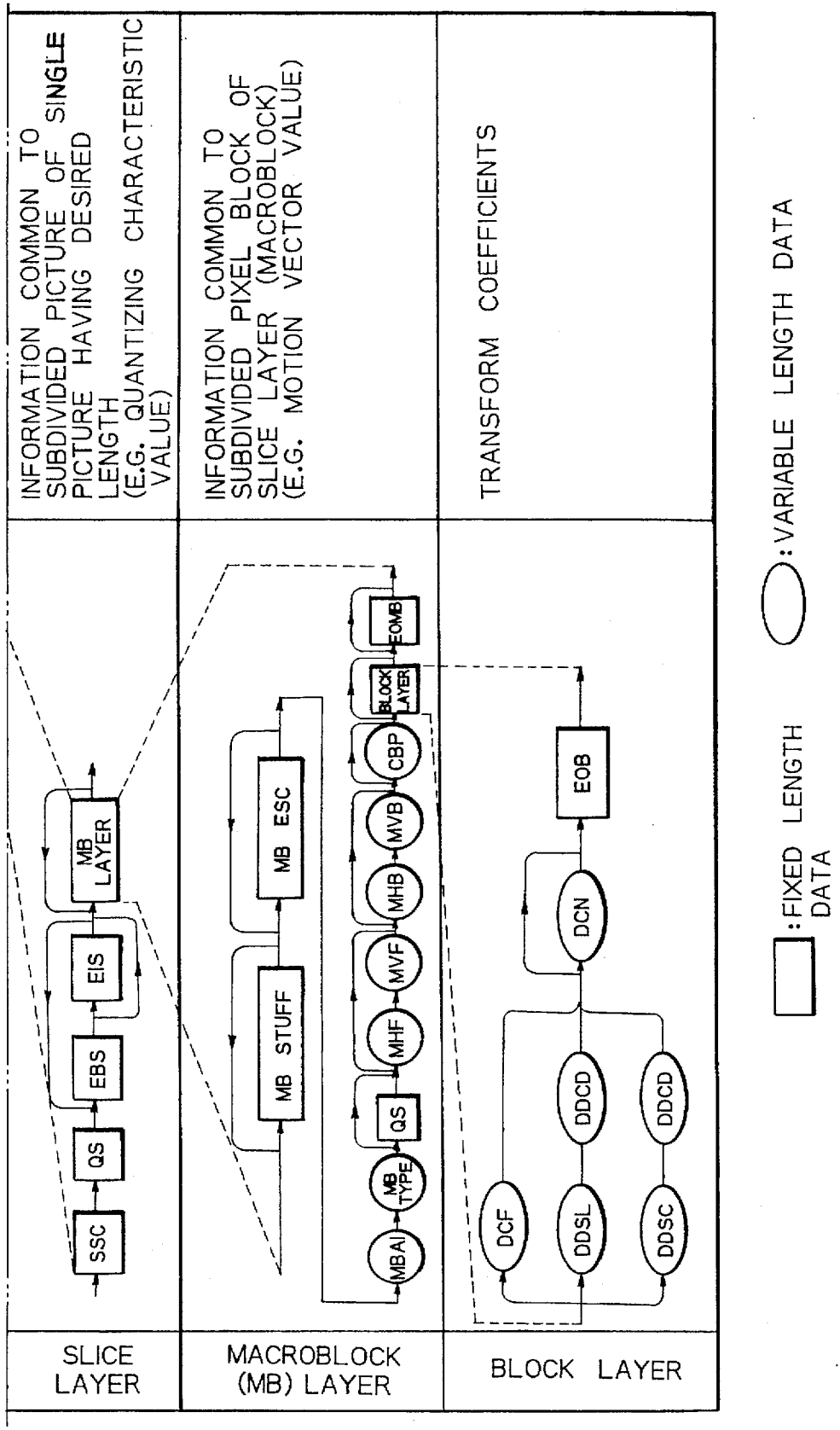

The multiplexer 222 multiplexes in the preselected position of the structure shown in FIGS. 12A and 12B various attribute signals received from the controller 242 via a signal line 356. The attribute signals are, e.g., code values having a fixed length and representative of aspect ratios and picture types, or code values having a variable length and representative of macroblock addresses and macroblock types. In addition, under the control of the control signal 345, the multiplexer 222 multiplexes motion vector values received from the two predictors 234 and 236 via the signal lines 350 and 352, respectively, in the preselected position of the structure shown in FIGS. 12A and 12B.

Particularly, in the illustrative embodiment, the multiplexer 222 multiplexes, when the button of the previously mentioned print-out button circuit 244 is pushed, a code indicative of an I picture and received from the controller 242 via the signal line 356 in a PCT (Picture Coding Type) area included in the picture layer of FIG. 12A. Further, when the above button is pressed, the multiplexer 222 receives still picture mode information from the controller 242 via the signal line 356 and multiplexes it in a UD (User Data) area included in the GOP layer of FIG. 12A. The still picture mode information is indicative of, e.g., the automatic print-out of the sixth or I picture, which will be described, by the printer 6 or the reproduction of the same on the monitor 5. The above PCT area and UD area are only illustrative and should only be selected beforehand in the system.

In the embodiment, the multiplexer 222 further multiplexes the above multiplexed data in the preselected fields of a frame format adaptive to CD-ROMs, and produces a signal 112 representative of the multiplex frame format on its output 112. The signal 112 is applied to and recorded in the recording/reproducing device 4 via the compressed picture data output terminal DOUT.

On the other hand, the dequantizer 226 dequantizes the normalized data received from the quantizer 218 via the signal line 344 by multiplying them by the same coefficients as used by the quantizer 218. The dequantization is controlled by a control signal fed from the controller 242 via a control line 366. The dequantizer 226 has its output 364 connected to the inverse DCT circuit 228.

The inverse DCT circuit 228 performs bidimensional inverse orthogonal transform with the dequantized data input thereto from the dequantizer 226. Then, the circuit 228 combines a plurality of blocks based on the inversely transformed data so as to form a macroblock of picture data, and produces the macroblock on its output 368. For the inverse DCT transform, a control signal is fed from the controller 242 to the circuit 228 via a control line 370. The inversely transformed data are delivered to the adder 230.

The adder 230 adds, under the control of a control signal 374 fed from the controller 242, the pixel data output from the inverse DCT circuit 228 and the pixel data corresponding to the above pixel data and fed from the fourth switching circuit 240 via a signal line 332. The result of addition is delivered from the adder 230 to the corresponding input of the third switch 232 via the output 372 of the adder 230 and a signal line 372.

The third switching circuit or selector 232 selectively connects its input 372 to one of its two outputs 376 and 378 under the control of a control signal 374 fed from the controller 242. In the illustrative embodiment, the selector 232 selects the outputs 376 and 378 alternately. The outputs 376 and 378 are connected to the inputs of the first and second predictors 234 and 236, respectively.

The two predictors 234 and 236 each has a DRAM or similar storage and a motion compensating circuit, although not shown specifically. The storages of the predictors 234 and 236 each receives one frame of picture data for the prediction from the future (backward prediction) or from the past (forward prediction) from the adder 230 via the third switching circuit 232, and stores them. The motion compensating circuits each search the associated storage device to find a macroblock most analogous to the macroblock which has just been input to the signal line 330 so as to be coded. At this instant, in the embodiment, the motion compensating circuit searches the storage device over a range of ±15 pixels in the horizontal and vertical directions. The predictors 234 and 236 produce the data of the most analogous macroblocks on outputs 384 and 386, respectively. Further, each motion compensating circuit has a calculating circuit for determining a motion vector on the basis of the positional relation between the input macroblock and the analogous macroblock. The motion vector appears on an output 350 or 352. To determine the motion vector, either the full search or the tree search may be used, as desired. The controller 242 feeds control signals to the inputs 382 and 388 of the predictors 234 and 236 for controlling the above procedure.

The mean circuit 238 receives, e.g., the data for forward prediction from the first predictor 234 on its input 384 and receives the data for backward prediction from the second predictor 236 on its input 386 in parallel with the data from the predictor 234. The circuit 238 averages, or interpolates, the two inputs by, e.g., adding them and then dividing the sum by 2, and produces the mean data on its output 390.

The fourth switching circuit or selector 240 selectively connects one of its four inputs 384, 386, 390 and 392 to its output 332. Specifically, the selector 240 selects the input 384 or 386 at the time of generation of a P picture, selects the input 390 at the time of generation of a B picture, or selects the input 392 at the time of generation of an I picture. The input 392 is connected to ground by a signal line 392 and serves to output the previously mentioned data "0". The selector 240 has its output 332 connected to the corresponding input of the subtracter 214.

The button circuit 244 is one of the characteristic features of the coding device 1, as mentioned earlier. For example, the operator watching the moving picture output from the camera 3 on the monitor 5 pushes the button of the circuit 244 when a desired scene appears on the monitor 5. Then, the output 396 of the circuit 244 goes, e.g., low (logical ZERO) when the button is pushed or goes high (logical HIGH) when it is not pushed. The output 396 is connected to the corresponding input of the controller 242.

The controller 242 controls the operations of the various sections constituting the coding device 1 and may advantageously be implemented by a processing system. The controller 242 has its input 108 connected to the input terminal SYIN of the device 1 by the signal line 108. The controller 242 generates various control signals necessary for the constituents of the device 1 out of the synchronizing signals input to the input terminal SYIN while delivering them to the individual constituent.

Assume that the output signal of the button circuit 244 is in a high level, i.e., a moving picture mode is set up. Then, the controller 242 controls the entire coding device 1 such that the pictures sequentially received from the camera 3 and constituting, e.g., a group of pictures GOP1 included in the stream b of FIG. 9 are coded in the order shown in GOP1 of a stream c. On the other hand, when the output signal of the button circuit 244 is in a low level, meaning that a still picture mode is selected, the controller 242 controls the device 1 such that, e.g., pictures constituting a group of pictures GOP2 included in the stream b are coded in the order shown in GOP2 of the stream c. More specifically, when the output signal of the button circuit 244 is in a low level, the controller 242 determines that the operator desires to print, e.g., the sixth picture, as counted from the front, of COP following the GOP coincident with the time of detection of the low level and controls the various sections accordingly. In the still picture mode, the controller 242 subdivides one COP (consisting of M=3 and N=9) formed in the moving picture mode into a first GOP (M=3 and N=3) and a second GOP (M=3 and N=6) and controls the various sections on the basis of such subdivision. It is to be noted that the sixth picture mentioned above is the third picture of the second GOP as counted from the front. Specifically, the controller 242 executes control based on the above recognition and subdivision such that the sixth P picture from the front in the moving picture mode turns out an I picture.

Furthermore, upon detecting that the output signal of the button circuit 244 is in a low level, the controller 242 generates a code showing that the picture type of the sixth picture has changed, in the embodiment, from the P picture to the I picture. The controller 242 feeds this code to the multiplexer 222 via its output 356. In addition, the controller 242 generates various kinds of information including one representative of the operation of the button, and one indicative of the automatic printing or the display of, e.g., the sixth or I picture as a still picture. These information are also applied to the multiplexer 112 via the signal line 356. While the embodiment automatically selects the sixth P picture from the front as an I picture, it may alternatively select the ninth P picture as an I picture and causes it to be automatically printed as a still picture. In addition, the coding device 1 may be provided with a manual button for allowing the operator to select either the sixth P picture or the ninth P picture as an I picture, as desired.

The operation of the coding device 1 having the above construction will be described hereinafter. Assume that the moving picture mode is selected by the operator, and that the luminance signal Y and chrominance signals Cr and Cb which are NTSC analog signals are sent from the camera 3 to the coding device 1. Then, the ADC 202 transforms the input signals Y, Cr and Cb to corresponding digital luminance data Y and chrominance data Cr and Cb and delivers them to the preprocessor 204. Specifically, the ADC 202 digitizes the luminance signal Y over 240 effective scanning lines (for a single field) and with a resolution of 720 dots for a single scanning line. Also, the ADC 202 digitizes each of the chrominance signals Cr and Cb over 240 effective scanning lines, but with a resolution of 360 dots for a single scanning line. The preprocessor 204 receives the data having the above dot and scanning line configuration from the ADC 202 field by field. In response, the preprocessor 204 produces data with the NTSC SIF parameters from the first and second fields of data, and sequentially feeds them to the first frame memory 206 frame by frame (picture by picture). The frame-by-frame input of the SIF data to the frame memory 206 is represented by the stream b shown in FIG. 9; each picture describes the picture type of the coding system to be adopted.

B0 data, B1 data, I2 data and B3 data included in GOP1 of the stream b, FIG. 9, are respectively written to the first, second, third and fourth frame memories of the first frame memory 206. The B0 data and B1 data are respectively read out of the first and second frame memories of the memory 206 and then written to the first and second frame memories of the second frame memory 210. Assume that when the B4 data also included in the stream b and following the data B3 are about to be written to the fifth frame memory of the memory 206, the operator pushes the button of the button circuit 244 to select the still picture mode (see a waveform a, FIG. 9). Then, because the button is pushed within the period of GOP1, the pictures constituting GOP1 are coded in the order assigned to the moving picture mode while the pictures constituting GOP2 following GOP1 are coded in the order assigned to the still picture mode. As the stream b of FIG. 9 indicates, the sixth picture is P5 in the moving picture mode, but it is I5 in the still picture mode.

The controller 242 causes the I2 data of GOP 1, which should be coded first, to be read out of the third frame memory of the memory 206 on a macroblock basis and input to one input 330 of the subtracter 214 via the second switching circuit 212. At the same time, the controller 242 causes the data "0" to be input to the other input 332 of the subtracter 214. The subtracter 214 subtracts the data "0" from the I2 data and delivers the resulting difference to the DCT circuit 216; that is, the picture data output from the subtracter 214 are subjected to intra-frame predictive coding by the DCT circuit 216 and circuitry following it.

The DCT circuit 216 subdivides each macroblock of data into a plurality of blocks of data, executes bidimensional orthogonal transform with each of the blocks of data, and then feeds the transformed data, or transform coefficients, to the quantizer 218. The quantizer 218 normalizes the transform coefficients and applies the normalized transform coefficients to the variable length coder 220 and dequantizer 226. The coder 220 codes the input transform coefficients by Huffman coding and delivers the variable length coded data to the multiplexer 222. The multiplexer 222 regulates the input coded data to a preselected length while confining the amount of codes constituting each block in a preselected range. The multiplexer 222 multiplexes the regulated code data in the preselected position shown in FIG. 12B. Further, the multiplexer 222 multiplexes the attribute signals received from the controller 242 in the preselected position shown in FIGS. 12A and 12B. In addition, the multiplexer 222 multiplexes the so multiplexed data in the preselected positions of a frame format matching CD-ROMs. The signal of the format matching the CD-ROM is fed to and stored in the recording/reproducing device 4 via the output DOUT of the coding device 1. Specifically, the I2 data of GOP 1 (stream c, FIG. 9) are output to the recording/reproducing device 4 and stored therein as I2 data (stream d, FIG. 9).

On the other hand, the dequantizer 226 multiplies the normalized transform coefficients received from the quantizer 218 by the quantizing coefficient and sends the dequantized data to the inverse DCT circuit 228. The inverse DCT circuit 228 executes bidimensional inverse orthogonal transform with the dequantized data and combines a plurality of blocks to prepare a macroblock of picture data. Such picture data are sequentially fed from the DCT circuit 228 to the adder 230 on a macroblock basis. The adder 230 adds the inversely transformed data to the data "0" fed from the fourth switching circuit 240, and delivers the sum to the first predictor 234 via the third switching circuit 232. The predictor 234 stores the sum data, i.e., one picture of I2 data sequentially received from the adder 230. At this instant, P8 data included in GOP0 preceding GOP1 have already been stored in the second predictor 236.

On completing the processing of the I2 data of GOP1, the controller 242 causes the B0 data of GOP1, which should be coded next, to be read out of the first frame memory of the second frame memory 210 on a macroblock basis. The I2 data are fed to one input of the subtracter 214 via the second switching circuit 212. At the same time, the controller 242 causes the data output from the mean circuit 238 to be applied to the other input 332 of the subtracter 214 via the fourth switching circuit 240. The subtracter 214 performs subtraction with the two input data and delivers the resulting difference to the DCT circuit 216. In this case, the data output from the mean circuit 238 are the data produced by averaging the I2 data of GOP1 and the P8 data of GOP0 which have been stored in the predictors 234 and 236, respectively. Stated another way, the subtracter 214 executes interpolative inter-frame predicting coding for generating a B picture. When use is made of motion-compensated data for the above subtraction, data representative of a vector value of that instant is fed from the predictor 234 and/or the predictor 236 to the multiplexer 222.

The data from the subtracter 214 are processed by the circuitry extending from the DCT circuit 216 to the multiplexer 222 in the previously described manner. As a result, the B0 data of GOP1 are sent from the coding device 1 to the recording/reproducing device 4 and stored therein. In this case, the circuitry extending from the dequantizer 226 to the adder 230 does not have to operate. Hence, the I2 data of GOP1 and the P8 data of GOP0 are left in the predictors 234 and 236, respectively.

The controller 242 fully dealt with the B0 data of GOP 1 causes the B1 data of GOP1, which should be coded next, to be read out of the second frame memory of the memory 210 and fed to one input 330 of the subtracter 214 via the second switching circuit 212. At the same time, the controller 242 causes the data output from the mean circuit 238 to be applied to the other input 332 of the subtracter 214 via the fourth switching circuit 240. The subtracter 214 performs subtraction with the two input data. The output of the subtracter 214 is processed by the circuitry extending from the DCT circuit 216 to the multiplexer 222 in the previously stated manner. As a result, the B1 data of GOP1 are sent from the coding device 1 to the recording/reproducing device 4 and stored therein.

The controller 242 causes the B4 data, P5 data, B6 data, B7 data and P8 data of GOP1 to be respectively written to the fifth frame memory to the ninth frame memory of the first frame memory 206. Also, the controller 242 causes the B3 data and B4 data respectively read out of the fourth and fifth frame memories of the memory 206 to be respectively written to the first and second frame memories of the second frame memory 210 via the first switching circuit 208.

First, the controller 242 causes the P5 data of GOP 1, which should be coded next, to be read out of the sixth frame memory of the memory 206 on a macroblock basis and delivers them to one input of the subtracter 214 via the second switching circuit 212. At the same time, the controller 242 causes the data output from the first predictor 234 to be applied to the other input 332 of the subtracter 214 via the fourth switching circuit 240. At this instant, the I2 data of GOP1 exist in the first predictor 234. The subtracter 214 performs subtraction with the two input data and delivers the resulting picture data to the DCT circuit 216. Stated another way, the subtracter 214 executes forward inter-frame predictive coding for generating a P picture. When use is made of motion-compensated data for the above subtraction, data representative of a vector value of that instant is fed from the predictor 234 to the multiplexer 222.

The data output from the subtracter 214 are processed by the circuitry extending from the DCT circuit 216 to the multiplexer 222 in the previously stated manner. As a result, the P5 data of GOP1 are fed from the coding device 1 to the recording/reproducing device 4 and stored therein. The data output from the dequantizer 226 are processed by the circuitry extending from the dequantizer 226 to the inverse DCT circuit 228 by the procedure also stated previously. The adder 230 adds the inversely transformed data value output from the inverse DCT circuit 228 and the data value received from the first predictor 234 via the fourth switching circuit 240. The resulting sum is fed to the second predictor 236 via the third switching circuit 232. As a result, the P5 data of GOP1 are stored in the second predictor 236. At this instant, the I2 data of GOP1 are left in the first predictor 234. By the above procedure, B3 data, B4 data, P8 data, B6 data and B7 data are also coded one after another and then sent to the recording/reproducing device 4.

In GOP2 following GOP1, the pictures up to I5 (stream c, FIG. 9) are sequentially coded in the same manner as in the moving picture mode. Pictures B3 and B4 of GOP2 are respectively produced from I2 and I5 of GOP2 while a picture P8 of GOP2 is produced from I5 and P8 of GOP2. Further, pictures B6 and B7 of GOP2 are respectively produced from I5 and I8 of GOP2. On the other hand, the controller 242 detecting the low level output of the button circuit 244 generates a code indicative of an I picture and sends it to the multiplexer 222 in order to switch the picture type from the P picture to the I picture. In addition, the controller 242 generates, e.g., information for causing the still picture of the I or sixth picture to be automatically printed or displayed and sends it to the multiplexer 222. The multiplexer 222 multiplexes the code indicative of an I picture in the PCT area included in the picture layer, FIG. 12A, and corresponding to the picture I5, multiplexes the print-out or display information in the UD area included in the GOP layer, FIG. 12A, and multiplexes the above picture data in the preselected area. These multiplexed code, information and data are sent to the recording/reproducing device 4.

As stated above, when the controller 242 receives a signal indicative of the still picture mode from the button circuit 244, it determines a picture group immediately following the current picture group to be the group designated by the above signal, and then replaces a P picture included in the group with an I picture having a higher resolution than the P picture. In addition, to allow the high resolution I picture to be effectively reproduced, the controller 242 provides the multiplexer 222 with information indicative of the still picture mode and the replacement of the P picture with the I picture. The multiplexer 222 multiplexes such information in the preselected positions of the output data format.

Figure 2A:
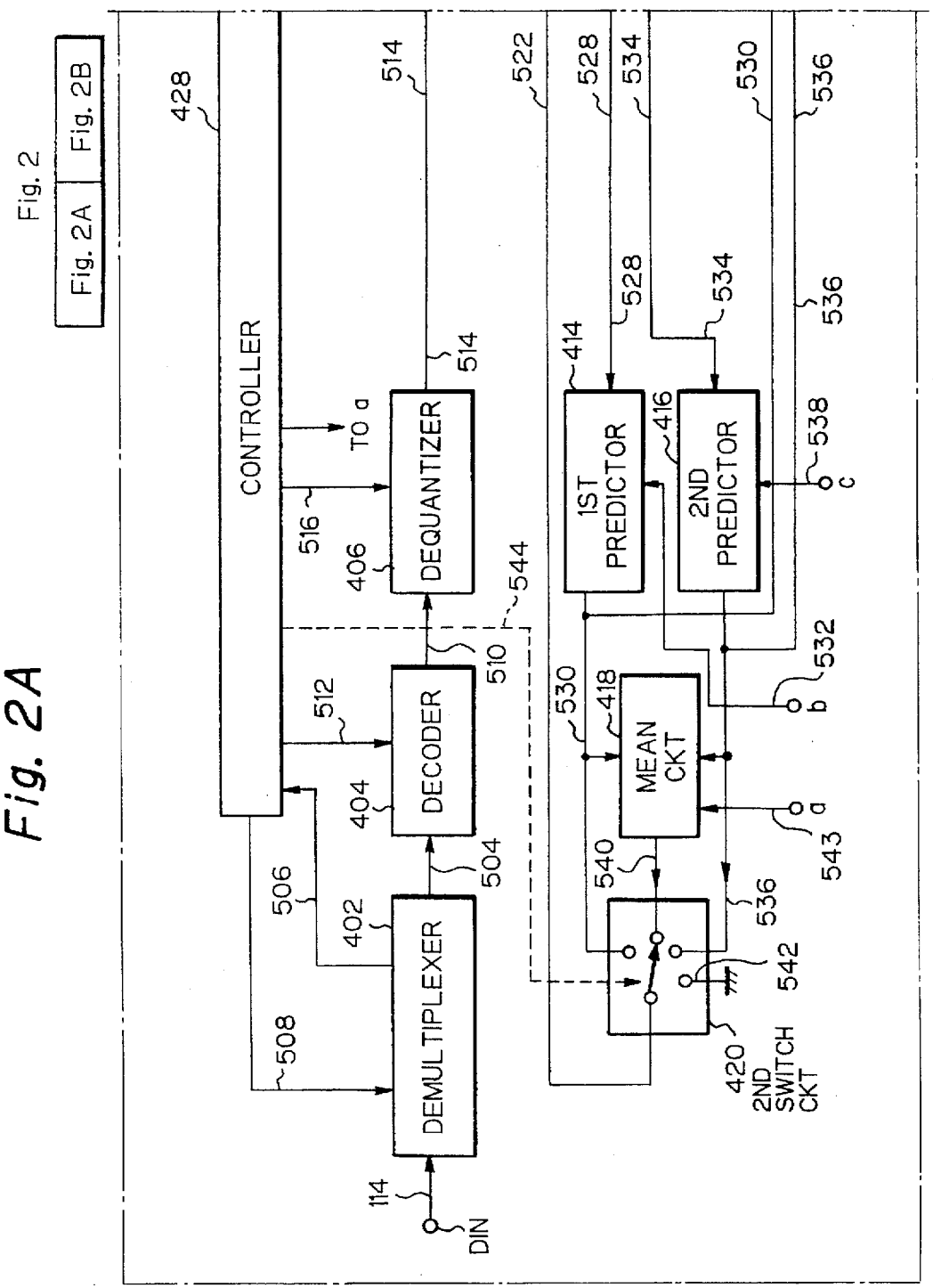
FIGS. 2A and 2B are combined.
Figure 2B:
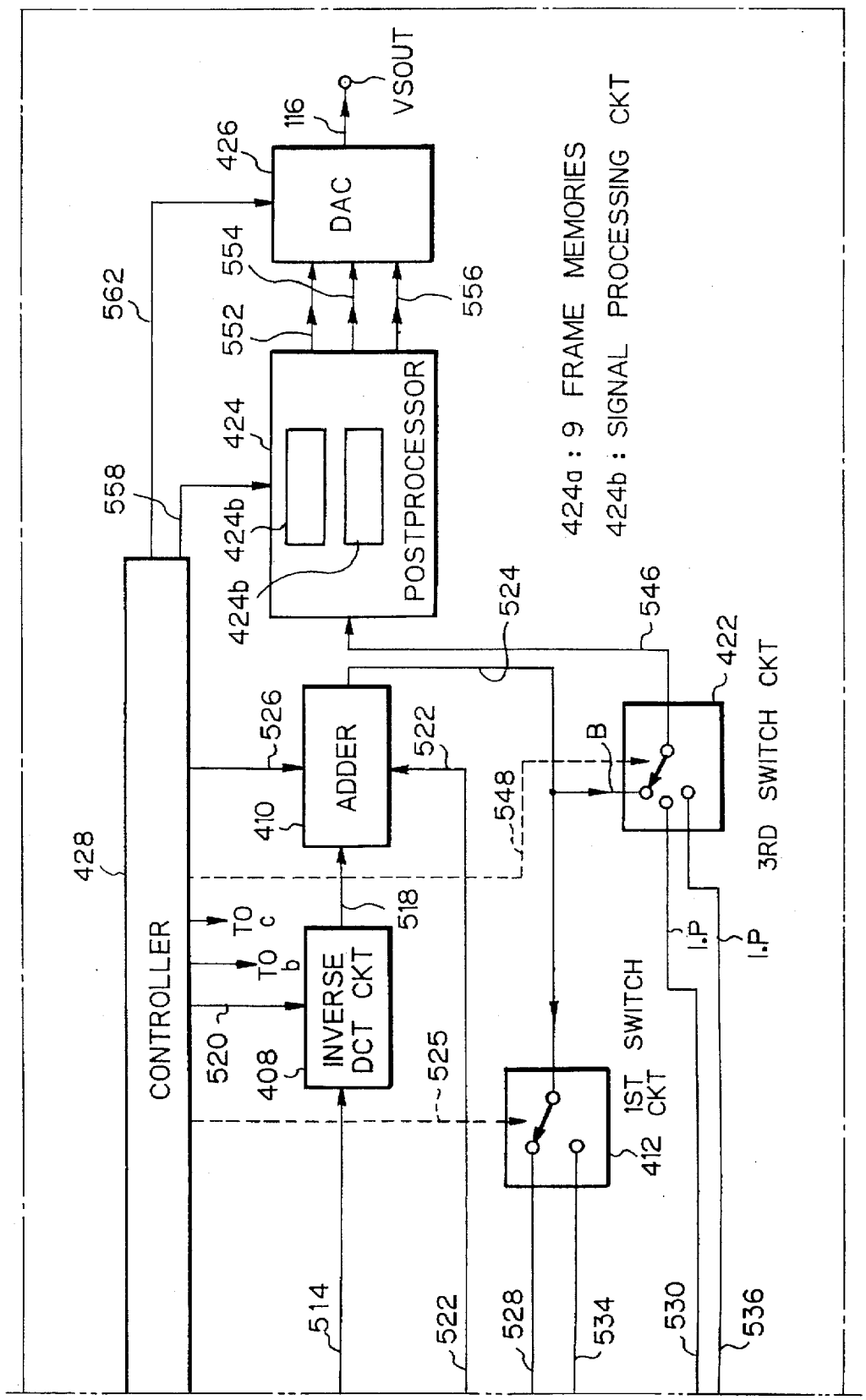

Referring to FIGS. 2A and 2B, the expansion reproducing device 2 is shown in detail and reproduces or expands the video data coded or compressed by the coding device 1. As shown, the reproducing device 2 is made up of a demultiplexer 402, a decoder 404, a dequantizer 406, an inverse DCT circuit 408, an adder 410, a first switching circuit 412, a first predictor 414, a second predictor 416, a mean circuit 418, a second switching circuit 420, a third switching circuit 422, a postprocessor 424, a digital-to-analog converter (DAC) 426, and a controller 428.

The demultiplexer 402 has an input 114 connected to the input terminal DIN of the reproducing device 2. The signal whose format matches a CD-ROM and sent from the coding device 1 or the recording/reproducing device 4 is input to the input terminal DIN. The demultiplexer 402 demultiplexes the input signal to thereby separate the picture data and control data under the control of a control signal fed from the controller 428 via a signal line 508. The separated picture signal and control data respectively appear on the outputs 504 and 506 of the demultiplexer 402. The outputs 504 and 506 are respectively connected to the input of the decoder 404 and the input of the controller 428. The controller 428 controls the entire reproducing device 2 in accordance with the input control data 506.

The decoder 404 decodes the coded data received from the demultiplexer 402 by Huffman decoding on a coded data basis in response to a control signal fed from the controller 428 via a control line 512. The decoded data or normalized data are delivered to the dequantizer 406 via the output 510 of the decoder 404.

The dequantizer 406 multiplies the input normalized data by the quantizing coefficients received from the controller 404 via a control line 516, thereby dequantizing the data. The dequantized data appear on the output 514 of the dequantizer 406. The dequantization is controlled by a signal also received from the controller 428 via the control line 516. The dequantized data 514 are fed to the inverse DCT circuit 408.

The inverse DCT circuit 408 subjects the dequantized data received from the dequantizer 406 to bidimensional inverse orthogonal transform under the control of a control signal fed from the controller 428 via a control line 520. The inversely transformed data are applied to the adder 410 via the output 518 of the inverse DCT circuit 408.

Assume that picture data representative of the I picture, i.e., subjected to the intra-frame predictive coding are applied to the input 518 of the adder 410. Then, in the illustrative embodiment, the adder 410 adds the data value "0", which will be described, received from the second switching circuit 420 to the input data value 518. The result of addition appears on an output 524. In this case, the pixel data 518 arrived at the input 518 directly appear on the output 524. Alternatively, the input data 518 may be directly applied to the output 524 without the addition of the data value "0", if desired. On the other hand, assume that video data representative of the P picture, i.e., subjected to forward inter-frame predictive coding are input to the adder 410. Then, in the embodiment, the adder 410 adds to the input data value 518 the data value 522 of the I picture or P picture received from the second predictor 416 via the second switching circuit 420. The result of addition also appears on the output 524. Further, when data representative of the B picture, i.e., subjected to bidirectional predictive coding are input to the adder 410, the adder 410 adds, in the embodiment, mean (interpolation) data 522 received from the mean circuit 418 via the second switching circuit 420 to the input data value 518. The above addition is controlled by a control signal 526 fed from the controller 428. The output 524 of the adder 410 is connected to the corresponding inputs of the first and third switching circuits 412 and 422.

The I or P picture data applied to the input 524 of the first switching circuit or selector 412 are selectively applied to one of the outputs 528 and 534 of the selector 412 under the control of a control signal 525 fed from the control circuit 428 to the selector 412. In the embodiment, the outputs 528 and 534 are selected alternately by the control signal 428. The outputs 528 and 534 are respectively connected to the input of the first predictor 424 and that of the second predictor 416.

The first predictor 414 has a DRAM or similar storage and stores therein one frame of data of the I or P picture received from the first switching circuit 412. The predictor 414 receives a motion vector value from the controller 428 on its input 532 and reads the data based on the vector value out of the storage as a predicted block. The data of the predicted block are fed to the adder 410 via the output 530 of the predictor 414, mean circuit 418, and second switching circuit 420. Further, the predictor 414 reads the video data out of the storage and delivers them via its output 530 as a reproduced picture block. The above procedure is controlled by control signals fed from the controller 428 via the control line 532. The output 530 of the predictor 414 is connected to the corresponding inputs of the mean circuit 418, second switching circuit 420, and third switching circuit 422.

The second predictor 416 will not be described specifically because it is basically identical with the first predictor 414 as to construction and operation. The output 536 of the predictor 416 is connected to the corresponding inputs of the mean circuit 418, second switching circuit 420, and third switching circuit 422. The predictor 416 has a control input 538 connected to the corresponding output of the controller 428.

The mean circuit 418 averages, or interpolates, the data fed from the two predictors 414 and 416 and corresponding to each other, and produces the resulting mean data on its output 540. The operation of the mean circuit 418 is controlled by a control signal fed from the controller 428 via a control line 543.

The second switching circuit or selector 420 selectively connects one of its four inputs 530, 536, 540 and 542 to its output 522 under the control of a control signal 544 fed from the controller 428. Basically, the selector 420 selects the input 530 or 536 for generating the P picture, selects the input 540 for generating the B picture, and selects the input 542 for generating the I picture. The output 522 of the selector 420 is connected to the corresponding input of the adder 410.

The third switching circuit or selector 422 selectively connects one of its three inputs 524, 530 and 536 to its output 546 under the control of a control signal 548 fed from the controller 428. Basically, the selector 422 selects the input 530 or 536 when the reproduced I or P picture data should be sent to the postprocessor 424, and selects the input 524 when the reproduced B picture data should be sent to the postprocessor 424. The output 546 of the selector 422 is connected to the corresponding input of the postprocessor 424.

As shown in FIG. 2B, the postprocessor 424 has a frame memory 424a and a signal processing circuit 424b. In the illustrative embodiment, the frame memory 424a has a capacity great enough to accommodate the reproduced data representative of nine pictures constituting a single GOP, i.e., it is made up of nine frame memories #1 through #9. The memory 424a sequentially stores the reproduced data coming in via its input 546. At this stage of operation, the reproduced data have the SIF format. The signal processing circuit 424b receives signals having the SIF format stored in the memory 424a. Then, the circuit 424b produces from the received signals data having the same format as the data applied to the inputs 302, 304 and 306 of the preprocessor 204, FIG. 1A. As a result, the circuit 424b produces on its output 552 Y data identical in format with the data applied to the input 302 of the preprocessor 204, produces on its output 554 Cr data identical in format with the data applied to the input 304 of the preprocessor 204, and produces on its output 556 Cb data identical in format with the data applied to the input 306 of the preprocessor 306. Such processing is executed by control signals received from the controller 428 via a control line 558. If desired, the data stored in the two predictors 414 and 416 may be directly sent to the signal processing circuit 424b without the intermediary of the frame memory 424a.

The DAC 426 receives the Y data, Cr data and Cb data on its inputs 552, 554 and 556, respectively. The DAC 426 transforms the Y data, Cr data and Cb data to corresponding analog video signals, generates an NTSC video signal out of the analog video signals, and then produces it on its output 116, i.e., the output VSOUT of the reproducing device 2. For the conversion, control signals including sampling pulses are fed from the controller 428 to the DAC 426 via a control line 562.

The controller 428 controls and supervises the entire reproducing device 2 and may advantageously be implemented by a processing system. The controller 428 receives a signal representative of a macroblock type (MBTYPE) and other various kinds of signals on its control input 506. In response, the controller 428 generates various kinds of control signals and delivers them to the various constituents of the reproducing device 2. Particularly, in the embodiment, the controller 428 monitors the UD areas of the incoming GOP layer. If no information is present in the current UD area, the controller 428 determines that GOP associated with the UD area is in the moving picture mode. If the print-out information or the display information is present in the UD area, the controller 428 determines that the above GOP is in the still picture mode. On determining that the GOP is in the still picture mode, the controller 428 determines whether or not, in the embodiment, the sixth picture type of the GOP from the front is the I picture, referencing the PCT of the picture layer. If the PCT is representative of the I picture, the controller 428 causes the reproducing device 2 to output an NTSC video signal based on the data of the sixth or I picture. If desired, a manual button, not shown, for selecting the still picture mode may be provided on the reproducing device 2 and connected to the controller 428. Then, the operator is capable of selecting the data stored in any one of the nine memories of the frame memory 424a and the data stored in one of the two predictors 414 and 416, so that the reproducing device 2 will output a video signal representative of a still picture based on the data selected.

With the reproducing device 2 described above, it is possible to reproduce or expand the picture data coded by the coding device 1 by compression, as follows.

Assume that picture data represented by the picture stream d in FIG. 9 are sequentially input to the reproducing device 2; the I2 data of GOP1 are input first. The demultiplexer 402 demultiplexes the signal received from the recording/reproducing device 4 to thereby separate the picture data and control data. The picture data and control data are applied to the decoder 404 and controller 428, respectively. The controller 428 controls the various sections of the reproducing device 2 in accordance with the input control data. Further, the controller 428 monitors the UD of the GOP layer included in the control data and determines that GOP1 is in the moving picture mode due to the absence of user data.

The decoder 404 decodes the coded data of the picture I2 of GOP1 by Huffman decoding on a coded data basis, and delivers the decoded data to the dequantizer 406. The dequantizer 406 multiplies the decoded data by the quantizing coefficients and thereby dequantizes them. The dequantized data are fed from the dequantizer 406 to the inverse DCT circuit 408. The inverse DCT circuit 408 executes bidimensional inverse orthogonal transform with the input data, and feeds the inversely transformed data to the adder 410. The adder 410 adds the value of the input data and the data value "0" received from the second switching circuit 420. In this case, the result of addition is fed to the first predictor 414. Consequently, the I2 data of the GOP1 are written to the predictor 414. At this time, P8 data included in the preceding GOP0 have already been stored in the second predictor 416.

After the I2 data have been fully processed, coded B0 data of GOP1 are fed from the demultiplexer 402 to the decoder 404. The B0 data are processed in the previously stated manner by the circuitry extending from the decoder 404 to the inverse DCT circuit 408. As a result, the inversely transformed data are applied to the adder 410. The adder 410 adds the data value received from the DCT circuit 408 and the data value received from the mean circuit 418 via the second switching circuit 420, and delivers the sum data to the postprocessor 424 via the third switching circuit 422. Consequently, the B0 data of GOP 1 are written to the first frame memory of the postprocessor 424. Because the B0 data are representative of a B picture, they are not written to the predictors 414 and 416.

Subsequently, coded B1 data of GOP1 are fed from the demultiplexer 402 to the decoder 404. Because the B1 data are representative of the same B picture as represented by the B0 data, they are processed by the same circuitry as processed the B0 data. As a result, the B1 data are written to the second frame memory of the postprocessor 424. The B1 data, like the B0 data, are not written to the predictors 414 and 416.

After the processing of the B1 data of GOP1, coded P5 data of GOP1 are fed from the demultiplexer 402 to the decoder 404. The P5 data are dealt with by the circuitry extending from the decoder 404 to the inverse DCT circuit 408 in the previously described manner. The resulting inversely transformed P5 data are applied to the adder 410. The adder 410 adds the data value received from the inverse DCT circuit 408 and the data value received from the first predictor 414 via the second switching circuit 420. In this case, the sum data output from the adder 410 are fed to the second predictor 416. At this instant, the I2 data of GOP0 are left in the first predictor 414. The above procedure is repeated with the subsequent coded B3 data, B4 data, P8 data, B6 data, and B7 data. The resulting decoded or reproduced data are sequentially fed to the postprocessor 424 in the order of B3, B4, P5, B6, B7 and P8. These data are sequentially written to the fourth frame memory to the ninth frame memory of the postprocessor 424.

Assume that the controller 428 continuously monitoring the UDs of the incoming GOP layer has found print-out information or display information in any one of the UDs. Then, the controller 428 determines that the GOP associated with the UD is in the still picture mode. Even in the GOP2 portion which is in the still picture mode, the reproducing device 2 sequentially decodes the coded picture data in the same manner as in the moving picture mode. The decoded or reproduced data are sequentially fed to the postprocessor 424 in the order of B0, B1, I2, B3, B4, I5, B6, B7. These data are sequentially written to the first frame memory to the ninth frame memory of the postprocessor 424. Subsequently, the controller 428 determines that the sixth picture is an I picture by referencing the PCT of the picture layer. Then, the controller 428 causes the I5 data to be read out of the sixth frame memory of the postprocessor 424 and feeds them to the DAC 426. The DAC 426 sends an NTSC video signal based on the input I5 data to the monitor 5 and printer 6. As a result, the monitor 5 displays a still picture represented by the I5 data while the printer 6 prints the still picture on a recording medium.

As stated above, when the controller 428 receives information indicative of the still picture mode and included in the control data output from the multiplexer 402 and information designating a particular reproduced picture included in a single group of pictures, it allows data representative of the particular picture to be output from the predictor 414 or 416 or from one of the frame memories of the postprocessor 424. The picture represented by the above data has a high resolution.

In summary, in accordance with the present invention, a compression coding device includes control means having the following functions. To generate data representative of a first type of picture by coding, the control means causes data representative of a picture, which is to be coded, to be input to a coder. To generate a second type of picture by inter-frame forward predictive coding, the control means causes the above data to be applied to a first input terminal of a subtractor and feeds a select signal for selecting past data to a selector. In response, the a selector selects past data stored in one of second and third storing devices and delivers them to a second input terminal of the subtractor. The subtractor means performs subtraction with the two input data and feeds the resulting data to the coder. Further, to generate a third type of picture, the controller causes data representative of the picture, which should be coded, to be fed from first storing device to the first input of the subtractor. Also, the controller delivers a select signal for selecting mean data to the selector. In response, the selector selects mean data output from averaging device and feeds them to the second input of the subtractor. Then, the subtractor again performs subtraction with the two input data and delivers the resulting data to the coder. Assume that at least one first type of picture, a preselected number of third type of pictures and at least one second type of picture are sequentially input to the coder in this order. Then, when a moving picture mode is indicated by a mode signal, the controller causes the at least one first type of picture, preselected number of third pictures preceding the first picture, at least one second type of picture, and preselected number of third pictures preceding the second picture to be sequentially output in this order. When a still picture mode is indicated by the mode signal, the control means causes the at least one second type of picture appeared in the moving picture mode to be effectively replaced with the first type of picture higher in resolution than the second type of picture.

Further, in the still picture mode indicated by the mode signal, the controller determines a group of pictures appearing after the indication of the mode signal to be the picture group which should be dealt with in the still picture mode. Then, the controller delivers to multiplexing device information indicative of the still picture mode assigned to the above picture group and information indicative of the replacement of the second type of picture with the first type of picture. This allows the multiplexing device to effectively multiplex such information in the preselected positions of an output data format.

Also, in accordance with the present invention, an expansion reproducing device has controller having the following functions. To reproduce the first type of picture by inverse coding, the controller causes picture data decoded by inverse coder to be input to one of first and second storing devices. To reproduce the second type of picture by inverse interframe forward predicting coding, the controller causes the picture data decoded by the inverse coder to be input to a first input of an adder. Also, the controller feeds a select signal for selecting past data to a first selector. In response, the first selector selects past data stored in one of first and second storing devices and delivers them to a second input of the adder. The adder adds the input to data and feeds the resulting data to one of the first and second storing devices. Further, to reproduce the third type of picture by inverse bidirectional predictive coding, the controller causes the picture data decoded by the inverse coder to be input to the first input of the adder. Also, the controller feeds a select signal for selecting mean data to the first selector. In response, the first selector selects mean data and applies them to the second input of the adder. The adder adds the input two data. Hence, the controller has the following capability. Assume that the controller receives information indicative of the still picture mode included in control data output from a demultiplexing device and information designating, among a plurality of pictures constituting a single picture group, a reproduced picture and also included in the data. Then, the controller is capable of effectively outputting the data representative of the reproduced picture designated by the first or second storing devices, i.e., having a high resolution on the basis of the above information.

While the present invention has been described with reference to the particular illustrative embodiments, it is not to be restricted by the embodiments. It is appreciated that those skilled in the art can change or modify the embodiments without departing from the scope and spirit of the present invention. All such changes or modifications as would be obvious to one skilled in the art are intended to be within the scope of the following claims.

What is claimed is:

1. A compression coding device for coding a picture signal by handling a preselected number of pictures as a single group of pictures, and coding digital picture data representative of an individual picture of said single group of pictures and divided into a plurality of macroblocks, said compression coding device comprising:

first storing means for storing picture data representative of a picture to be coded subsequent to an input picture;

second storing means and third storing means for storing reproduced past picture data representative of a picture preceding the picture to be coded or reproduced future picture data representative of a picture following said picture to be coded;

averaging means for averaging said reproduced past picture data and said reproduced future picture data output from said second storing means or said third storing means to thereby output mean data;

selecting means for selecting and outputting one of said reproduced past picture data output from said second storing means or said third storing means, and said mean data output from said averaging means, in response to a select signal;

subtracting means for performing a subtraction with picture data representative of said picture to be decoded and received on a first input terminal thereof, and said past picture data or said mean data selected and output by said selecting means and received on a second input terminal thereof, to thereby output difference data;

coding means for coding said picture data representative of said picture to be coded or said output difference data;

button circuit means for outputting a command signal indicative of one of a moving picture mode and a still picture mode in response to a manual operation; and control means for controlling said first storing means, said second storing means, said third storing means, said averaging means, said selecting means, said subtracting means and said coding means in accordance with said output command signal;

wherein to generate data representative of a first type of picture by coding, said control means causes said picture data representative of said picture to be coded to be input to said coding means, wherein to generate a second type of picture by interframe forward predictive coding, said control means causes said picture data representative of said picture to be coded to be applied to said first input terminal of said subtracting means, feeds said select signal designating said reproduced past picture data to said selecting means to thereby feed said reproduced past picture data to said second input terminal of said subtracting means, causes said selecting means to select said reproduced past picture data stored in said second storing means or said third storing means and deliver said reproduced past picture data to said second input terminal of said subtracting means, and causes said subtracting means to perform the subtraction and deliver said difference data to said coding means, wherein to generate a third type of picture by bidirectional predictive coding, said control means causes said picture data representative of said picture to be coded to be fed from said first storing means to said first input terminal of said subtracting means, and delivers said select signal designating said mean data to said selecting means to thereby cause said selecting means to select said mean data and feed said mean data to said second input of said subtracting means, and causes said subtracting means to perform a subtraction and deliver said difference data to said coding means; and wherein when a preselected number of third type of pictures, at least one first type of picture, a preselected number of third type of pictures and at least one second type of picture are sequentially input in a predetermined order, and when said moving picture mode is indicated by said command signal, said control means causes said at least one first type of picture, said preselected number of third type of pictures preceding said first type of picture, said at least one second type of picture, and said preselected number of third type of pictures preceding said second type picture to be sequentially output in a predetermined order, or wherein when said still picture mode is indicated by said command signal, said control means causes said at least one second type of picture appeared in said moving picture mode to be replaced with said first type of picture.

2. A device in accordance with claim 1, wherein said coding means comprises:

orthogonal transforming means for subdividing data of a macroblock subtracted by said subtracting means into a plurality of blocks, and executing bidimensional orthogonal transform with data of each of said plurality of blocks to thereby output transformed data;

normalizing means for normalizing said transformed data to thereby output normalized data;

variable length coding means for coding said normalized data to thereby output coded data; and multiplexing means for multiplexing said coded data at a preselected position of a preselected output data format;

wherein said control means selects, when said command signal is indicative of said still picture mode, a group of pictures appearing after arrival of said command signal as a group of pictures to be processed in said still picture mode, feeds information representative of an assignment of said still picture mode to said group of pictures and information representative of a replacement of said second type of picture with said first type of picture to said multiplexing means, and causes said multiplexing means to multiplex said information in a preselected position of said preselected output data format.

3. A device in accordance with claim 2, further comprising:

inverse normalizing means for inversely normalizing said normalized data to thereby output inversely normalized data;

inverse orthogonal transforming means for executing bidimensional inverse orthogonal transform with said inversely normalized data to thereby output inversely transformed data; and adding means for adding said inversely transformed data received on a third input terminal thereof and said reproduced past picture data output from said second storing means or said third storing means or said mean data output from said averaging means and received on a fourth input terminal thereof to thereby feed a result of addition to said second storing means or said third storing means.

4. An expansion reproducing device for receiving a signal including digital picture data in which a preselected number of pictures are handled as a single group of pictures and coded by compression on a picture basis, and control data associated with said single group of pictures, and decoding said signal by applying an intra-frame coding system to at least one picture of said group of pictures, a forward inter-frame predictive coding system to at least one picture, and a bidirectional predictive coding system to a preselected number of pictures, wherein said control data include first information indicative of a still picture mode, second information representative of an assignment of the still picture mode to a group of pictures and third information representative of a replacement of a second type of picture with a first type of picture, the first, second and third information being multiplexed in preselected positions of data format of said signal, said expansion reproducing device comprising:

demultiplexing means for demultiplexing said signal for separating said digital picture data and said control data to thereby output demultiplexed picture data and demultiplexed control data;

inverse coding means for inversely coding said demultiplexed picture data to thereby output inversely coded picture data;

first storing means and second storing means for each storing past reproduced picture data representative of a past picture preceding a picture to be decoded or further past picture data representative of a further past picture preceding said past picture;

averaging means for averaging said reproduced past picture data and said reproduced further past picture data received from said first storing means or said second storing means to thereby output mean data;

first selecting means for selecting said reproduced past picture data received from said first storing means or said second storing means or said mean data received from said averaging means in response to a select signal;

adding means for adding data representative of said picture to be decoded and received from said inverse coding means via a first input terminal thereof, and said reproduced past picture data or said mean data received from said first selecting means via a second input terminal thereof; and control means for controlling said demultiplexing means, said inverse coding means, said first storing means, said second storing means, said averaging means, said first selecting means and said adding means in accordance with said demultiplexed control data;

wherein to reproduce the first type of picture by the inverse coding, said control means causes said inversely coded picture data to be input to said first storing means or said second storing means, wherein to reproduce the second type of picture by the inverse forward inter-frame predicting coding, said control means causes said inversely coded picture data to be input to said first input terminal of said adding means, feeds said select signal for selecting said reproduced past picture data to said first selecting means to thereby cause said first selecting means to deliver said reproduced past picture data stored in said first storing means or said second storing means to said second input terminal of said adding means, and causes said adding means to add said inversely coded picture data and said reproduced past picture data and feed a result of addition to said first storing means or said second storing means, wherein to reproduce the third type of picture by the inverse bidirectional predictive coding, said control means causes said inversely coded picture data to be input to said first input terminal of said adding means, feeds said select signal for selecting said mean data to said first selecting means to thereby cause said first selecting means to deliver said mean data to said second input terminal of said adding means, and causes said adding means to add said inversely coded data and said mean data and output a result of addition;

wherein, when said control means receives the first information and the third information, said control means causes data representative of said first type of picture stored in said first storing means or said second storing means to be output.

5. A device in accordance with claim 4, wherein said inverse coding means comprises:

decoding means for decoding said demultiplexed picture data to thereby output decoded picture data;

inverse normalizing means for inversely normalizing said decoded picture data to thereby output inversely normalized picture data; and inverse orthogonal transforming means for executing bidimensional inverse orthogonal transform with said inversely normalized picture data.

6. A device in accordance with claim 4, further comprising:

second selecting means for selecting said reproduced picture data output from said first storing means or said reproduced picture dada output from said second storing means or said inversely coded picture data in response to said select signal; and signal converting means for converting said reproduced picture selected by said second selecting means to a corresponding analog video signal, and feeding said analog video signal to an output terminal thereof.

7. A device in accordance with claim 6, wherein when an apparatus using said device is connected to said output terminal of said signal converting means, said analog video signal is output to said apparatus.

8. A device in accordance with claim 7, wherein said apparatus comprises one of a monitor for monitoring a still picture represented by said analog video signal and a printer for printing said still picture.

9. A compression coding device for coding a picture signal by handling a preselected number of pictures as a single group of pictures, and coding digital picture data representative of an individual picture of said single group of pictures and divided into a plurality of macroblocks, said compression coding device comprising:

a first storage device for storing picture data representative of a picture to be coded subsequent to an input picture;

a second storage device and third storage device for storing reproduced past picture data representative of a picture preceding the picture to be coded or reproduced future picture data representative of a picture following said picture to be coded;

an averaging circuit for averaging said reproduced past picture data and said reproduced future picture data output from said second storage device or said third storage device to thereby output mean data;

a selector for selecting and outputting one of said reproduced past picture data output from said second storage device or said third storage device, and said mean data output from said averaging circuit, in response to a select signal;

a subtractor for performing a subtraction with picture data representative of said picture to be decoded and received on a first input terminal thereof and said past picture data or said mean data selected and output by said selector and received on a second input terminal thereof to thereby output difference data;

a coder for coding said picture data representative of said picture to be coded or said output difference data;

a button circuit for outputting a command signal indicative of one of a moving picture mode and a still picture mode in response to a manual operation; and a controller for controlling said first storage device, said second storage device, said third storage device, said averaging circuit, said selector, said subtractor and said coder in accordance with said output command signal;

wherein to generate data representative of a first type of picture by coding, said controller causes said picture data representative of said picture to be coded to be input to said coder, wherein to generate a second type of picture by interframe forward predictive coding, said controller causes said picture data representative of said picture to be coded to be applied to said first input terminal of said subtractor, feeds said select signal designating said reproduced past picture data to said selector to thereby feed said reproduced past picture data to said second input terminal of said subtractor, causes said selector to select said reproduced past picture data stored in said second storage device or said third storage device and deliver said reproduced past picture data to said second input terminal of said subtractor, and causes said subtractor to perform the subtraction and deliver said difference data to said coder, wherein to generate a third type of picture by bidirectional predictive coding, said controller causes said picture data representative of said picture to be coded to be fed from said first storage device to said first input terminal of said subtractor, and delivers said select signal designating said mean data to said selector to thereby cause said selector to select said mean data and feed said mean data to said second input of said subtractor, and causes said subtractor to perform a subtraction and deliver resulting difference data to said coder; and wherein when a preselected number of third type of pictures, at least one first type of picture, a preselected number of third type of pictures and at least one second type of picture are sequentially input in a predetermined order, and when said moving picture mode is indicated by said command signal, said controller causes said at least one first type of picture, said preselected number of third type of pictures preceding said first type of picture, said at least one second type of picture, and said preselected number of third type of pictures preceding said second type of picture to be sequentially output in a predetermined order, or wherein when said still picture mode is indicated by said command signal, said controller causes said at least one second type of picture appeared in said moving picture mode to be replaced with said first type of picture.

10. A device in accordance with claim 9, wherein said coder comprises:

an orthogonal transform circuit for subdividing data of a macroblock subtracted by said subtracter into a plurality of blocks, and executing bidimensional orthogonal transform with data of each of said plurality of blocks to thereby output transformed data;

a normalizer for normalizing said transformed data to thereby output normalized data;

a variable length coding circuit for coding said normalized data to thereby output coded data; and a multiplexer for multiplexing said coded data at a preselected position of a preselected output data format;

wherein said controller selects, when said command signal is indicative of said still picture mode, a group of pictures appearing after arrival of said command signal as a group of pictures to be processed in said still picture mode, feeds information representative of an assignment of said still picture mode to said group of pictures and information representative of a replacement of said second type of picture with said first type of picture to said multiplexer, and causes said multiplexer to multiplex said information in a preselected position of said preselected output data format.

11. A device in accordance with claim 10, further comprising:

an inverse normalizer for inversely normalizing said normalized data to thereby output inversely normalized data;

an inverse orthogonal transform circuit for executing bidimensional inverse orthogonal transform with said inversely normalized data to thereby output inversely transformed data; and an adder for adding said inversely transformed data received on a third input terminal thereof and said reproduced past picture data output from said second storage device or said third storage device or said mean data output from said averaging circuit and received on a fourth input terminal thereof to thereby feed a result of addition to said second storage or said third storage.

12. An expansion reproducing device for receiving a signal including digital picture data in which a preselected number of pictures are handled as a single group of pictures and coded by compression on a picture basis, and control data associated with said single group of pictures, and decoding said signal by applying an intra-frame coding system to at least one picture of said group of pictures, a forward inter-frame predictive coding system to at least one picture, and a bidirectional predictive coding system to a preselected number of pictures, wherein said control data include first information indicative of a still picture mode, second information representative of an assignment of the still picture mode to a group of pictures and third information representative of a replacement of a second type of picture with a first type of picture, the first, second and third information being multiplexed in preselected positions of data format of said signal, said expansion reproducing device comprising:

a demultiplexer for demultiplexing said signal for separating said digital picture data and said control data to thereby output demultiplexed picture data and demultiplexed control data;

an inverse coder for inversely coding said demultiplexed picture data to thereby output inversely coded picture data;

a first storage device and a second storage device for each storing past reproduced picture data representative of a past picture preceding a picture to be decoded or further past picture data representative of a further past picture preceding said past picture;

an averaging circuit for averaging said reproduced past picture data and said reproduced further past picture data received from said first storage device or said second storage device to thereby output mean data;

a first selector for selecting said reproduced past picture data received from said first storage device or said second storage device or said mean data received from said averaging circuit in response to a select signal;

an adder for adding data representative of said picture to be decoded and received from said inverse coder via a first input terminal thereof, and said reproduced past picture data or said mean data received from said first selector via a second input terminal thereof; and a controller for controlling said demultiplexer, said inverse coder, said first storage device, said second storage device, said averaging circuit, said first selector and said adder in accordance with said demultiplexed control data;

wherein to reproduce the first type of picture by the inverse coding, said controller causes said inversely coded picture data to be input to said first storage device or said second storage device, wherein to reproduce the second type of picture by the inverse forward inter-frame predicting coding, said controller causes said inversely coded picture data to be input to said first input terminal of said adder, feeds said select signal for selecting said reproduced past picture data to said first selector to thereby cause said first selector to deliver said reproduced past picture data stored in said first storage device or said second storage device to said second input terminal of said adder, and causes said adder to add said inversely coded picture data and said reproduced past picture data and feed a result of addition to said first storage device or said second storage device, wherein to reproduce the third type of picture by the inverse bidirectional predictive coding, said controller causes said inversely coded picture data to be input to said first input terminal of said adder, feeds said select signal for selecting said mean data to said first selector to thereby cause said first selector to deliver said mean data to said second input terminal of said adder, and causes said adder to add said inversely coded data and said mean data and output a result of addition;

wherein, when said controller receives the first information and the third information, said controller causes data representative of said first type of picture stored in said first storage device or said second storage device to be output.

13. A device in accordance with claim 12, wherein said inverse coder comprises:

a decoder for decoding said demultiplexed picture data to thereby output decoded picture data;

an inverse normalizer for inversely normalizing said decoded picture data to thereby output inversely normalized picture data; and an inverse orthogonal transform circuit for executing bidimensional inverse orthogonal transform with said inversely normalized picture data.

14. A device in accordance with claim 12, further comprising:

a second selector for selecting said reproduced picture data output from said first storage device or said reproduced picture data output from said second storage device or said inversely coded picture data in response to said select signal; and a signal converter for converting said reproduced picture selected by said second selector to a corresponding analog video signal, and feeding said analog video signal to an output terminal thereof.

15. A device in accordance with claim 14, wherein when an apparatus using said device is connected to said output terminal of said signal converter, said analog video signal is output to said apparatus.

16. A device in accordance with claim 15, wherein said apparatus comprises one of a monitor for monitoring a still picture represented by said analog video signal and a printer for printing said still picture.

17. A compression coding method for coding, upon receiving a signal in which a preselected number of pictures are handled as a single group of pictures, digital picture data representative of an individual picture of said single group of pictures, said compression coding method comprising the steps of:

inputting, when generating a first type of picture by a preselected coding system, data of a picture to be coded to a coder to thereby code said data;

performing, when generating data of a second type of picture by an inter-frame forward predictive coding system, a subtraction with said data of said picture to be coded and data of a past reproduced picture preceding said picture to be coded, and inputting data resulting from said subtraction to said coder to thereby code said data;

performing, when generating data of a third type of picture by a bidirectional predictive coding system, a subtraction with said data of said picture to be coded and mean data produced by averaging data of a past picture and data of a future picture respectively preceding and following said picture to be coded, and inputting data resulting from said subtraction to said coder to thereby code said data; and causing, when a preselected number of third type of pictures, at least one first type of picture, a preselected number of third type of pictures and at least one second type of picture are sequentially input in a predetermined order as said preselected number of pictures, and when a moving picture mode is selected, said coder to sequentially output said at least one first type of picture, said preselected number of third type of pictures preceding said at least one first type of picture, said at least one second type of picture and said preselected number of third type of pictures preceding said at least one second type of picture in a predetermined order, or causing, when a still picture mode is selected, said coder to replace said at least one second type of picture with said at least one first type of picture.

18. An expansion reproducing method for decoding a signal including digital picture data in which a preselected number of pictures are handled as a single group of pictures and coded by compression on a picture basis, and control data associated with said single group of pictures, wherein said control data include first information indicative of a still picture mode, second information representative of an assignment of the still picture mode to a group of pictures and third information representative of a replacement of a second type of picture with a first type of picture, the first, second and third information being multiplexed in preselected positions of data format of said signal, said expansion reproducing method comprising:

applying a preselected coding system assigned to the first type of picture to at least one picture included in said single group of pictures, applying an inter-frame forward predictive coding system assigned to the second type of picture to at least one picture included in said single group of pictures, and applying a bidirectional predictive coding system assigned to the third type of picture to a preselected number of pictures included in said single group of pictures;

inputting, when reproducing said first type of picture by inverse coding, data of a picture to be decoded to an inverse coder, and feeding decoded picture data output from said inverse coder to a first storing device or a second storing device;

performing, when reproducing said second type of picture by inverse inter-frame forward predictive coding, an addition with said decoded picture data output from said inverse coder and decoded reproduced picture data of a past picture preceding said picture to be coded, and feeding data resulting from said addition to said first storing device or said second storing device;

performing, when reproducing said third type of picture by inverse bidirectional predictive coding, an addition of said decoded picture data output from said inverse coder to mean data produced by averaging said decoded reproduced picture data of said past picture and decoded reproduced picture data of a further past picture preceding said past picture, and outputting a resultant addition; and causing, upon receiving the first information and the third information, data of said first type of picture to be output from said first storing device or said second storing device on the basis of said information.

* * * * *